(12) United States Patent
Bicego et al.

(10) Patent No.: US 12,544,916 B2
(45) Date of Patent: Feb. 10, 2026

(54) APPARATUS FOR AUTOMATICALLY REPLACING PRINTING SLEEVES

(71) Applicant: UTECO CONVERTING S.P.A., Colognola Ai Colli (IT)

(72) Inventors: Alessandro Bicego, San Giovanni Lupatoto (IT); Claudio Semperboni, Tregnago (IT); Stefano Mezzalana, Verona (IT)

(73) Assignee: UTECO CONVERTING S.P.A., Colognola Ai Colli (IT)

( * ) Notice: Subject to any disclaimer, the term of this patent is extended or adjusted under 35 U.S.C. 154(b) by 180 days.

(21) Appl. No.: 18/228,937

(22) Filed: Aug. 1, 2023

(65) Prior Publication Data
US 2024/0042602 A1 Feb. 8, 2024

(30) Foreign Application Priority Data
Aug. 4, 2022 (IT) .................. 102022000016587

(51) Int. Cl.
*B25J 13/08* (2006.01)
*B25J 9/16* (2006.01)
*B25J 15/00* (2006.01)

(52) U.S. Cl.
CPC ........... *B25J 9/1612* (2013.01); *B25J 13/085* (2013.01); *B25J 13/089* (2013.01); *B25J 15/0047* (2013.01)

(58) Field of Classification Search
CPC .... B41F 27/06; B41F 27/105; B41P 2227/21; B25J 9/1612; B25J 13/085; B25J 13/089; B25J 15/0047
See application file for complete search history.

(56) References Cited

FOREIGN PATENT DOCUMENTS

| | | |
|---|---|---|
| EP | 1705009 A1 | 9/2006 |
| EP | 2457729 | 5/2012 |
| EP | 2857200 A1 | 4/2015 |
| EP | 3199345 A1 | 8/2017 |
| EP | 3378645 A1 | 9/2018 |
| IT | FI20130287 A1 | 5/2015 |
| JP | 2021084170 A * | 6/2021 |

OTHER PUBLICATIONS

Italian Search Report and Written Opinion dated Feb. 28, 2023 issued in IT 102022000016587, with partial translation.

* cited by examiner

*Primary Examiner* — Christopher E Mahoney
*Assistant Examiner* — Marissa Ferguson-Samreth
(74) *Attorney, Agent, or Firm* — Scully, Scott, Murphy & Presser, P.C.

(57) ABSTRACT

An apparatus for replacing printing sleeves which comprises a handling device which can be removably engaged with a printing sleeve and a movement robot for moving the handling device; the handling device comprises a supporting frame and a self-centering grip clamp which is able to translate on command, with respect to the supporting frame, along a movement direction that is substantially parallel to the axis of the supporting rod, between an advanced working position and a retracted working position; the grip clamp has engagement elements which are movable on command between an inactive position and an active position, in which they are radially spaced apart from the axis of the supporting rod, in order to allow their engagement with the internal surface of the printing sleeve.

7 Claims, 26 Drawing Sheets

APPARATUS FOR AUTOMATICALLY REPLACING PRINTING SLEEVES

The present invention relates to an apparatus for replacing printing sleeves.

As is known, rotary printing machines have a plurality of rotating cylinders for transferring inks onto a ribbon of material in sheet form to be printed.

In particular, flexographic printing machines are known which have, on a supporting structure, a central drum that pulls the material in sheet form to be printed.

About the drum central a plurality of print assemblies are arranged, each one constituted by a plate cylinder, which is arranged adjacent to the central drum, and by an anilox roller, which transfers the ink to the plate cylinder.

Nowadays, plate cylinders are constituted by a supporting shaft, commonly known as a sleeve-holding shaft, which is mounted so that it can rotate on the supporting structure of the machine, and onto which a printing sleeve, which bears the image to be printed in relief, is removably engaged, fitted axially.

Optionally, the printing sleeve can in turn be constituted by a tubular holder, called a "carrier sleeve", over which a thinner printing sleeve, called a sleeve plate, is fitted, on the external surface of which the actual plate is present.

For each change of the images to be printed, it is necessary to dismount the printing sleeves mounted on the machine and substitute them with other printing sleeves, taken from a dedicated magazine, which bear the plate of the new images to be printed.

The operations to replace printing sleeves can be performed manually with the machine stopped by at least one operator who is brought to the print assemblies by way of a special mobile platform.

In order to facilitate the change of the printing sleeve to be removed by the operators, printing machines are equipped with a special expulsion device which is arranged on the opposite side with respect to the side of the machine where the operators are located and which axially disengages the printing sleeve from the supporting shaft just enough to allow the operators to manually grip the printing sleeve and complete its extraction from the supporting shaft.

Manual replacement of printing sleeves is, however, owing to their weight, extremely laborious for the operators, with consequent exposure of the operators to injury.

Furthermore, manual replacement requires long execution times, with consequent negative impact on the productivity of the machine.

In order to overcome these drawbacks, apparatuses have been devised that make it possible to automatically execute the operations to replace the printing sleeves.

In particular, apparatuses for replacing printing sleeves have been provided which comprise a handling device which is capable of removably engaging, by way of one or more grip assemblies, the printing sleeve to be replaced and is connected to an anthropomorphic robot, constituted by a plurality of articulated arms, which can move the handling device between a first position, in which the handling device is proximate to and aligned coaxially with a sleeve-holding shaft of a printing machine, and a second position, in which the handling device is for example proximate to and aligned coaxially with a sleeve-holding support of a rack or, in any case, of a magazine for storing printing sleeves.

In the apparatuses currently known, the handling device in general has a grip assembly that is not capable of adapting its grip to the printing sleeve that it extracts, such that if it is required to extract a printing sleeve that has different dimensions from those for which the grip assembly of the handling device is designed, it is necessary to replace the handling device.

The aim of the present invention is to provide an apparatus for replacing printing sleeves which is capable of improving the prior art in one or more of the above-mentioned aspects.

Within this aim, an object of the invention is to provide an apparatus for replacing printing sleeves that can be adapted to the dimensions of the printing sleeves to be replaced.

Another object of the invention is to provide an apparatus for replacing printing sleeves that can offer the widest guarantees of reliability and safety in its operation.

A Furthermore, another object of the present invention is to overcome the drawbacks of the prior art in an alternative manner to any existing solutions.

Another object of the invention is to provide an apparatus for replacing printing sleeves that is relatively easy to implement and which can be made at low cost.

This aim and these and other objects which will become better apparent hereinafter are achieved by an apparatus for replacing printing sleeves according to claim 1, optionally provided with one or more of the characteristics of the dependent claims.

Further characteristics and advantages of the invention will become better apparent from the detailed description that follows of a preferred, but not exclusive, embodiment of the apparatus for replacing printing sleeves according to the invention, which is illustrated for the purposes of non-limiting example in the accompanying drawings wherein.

Figure 1:
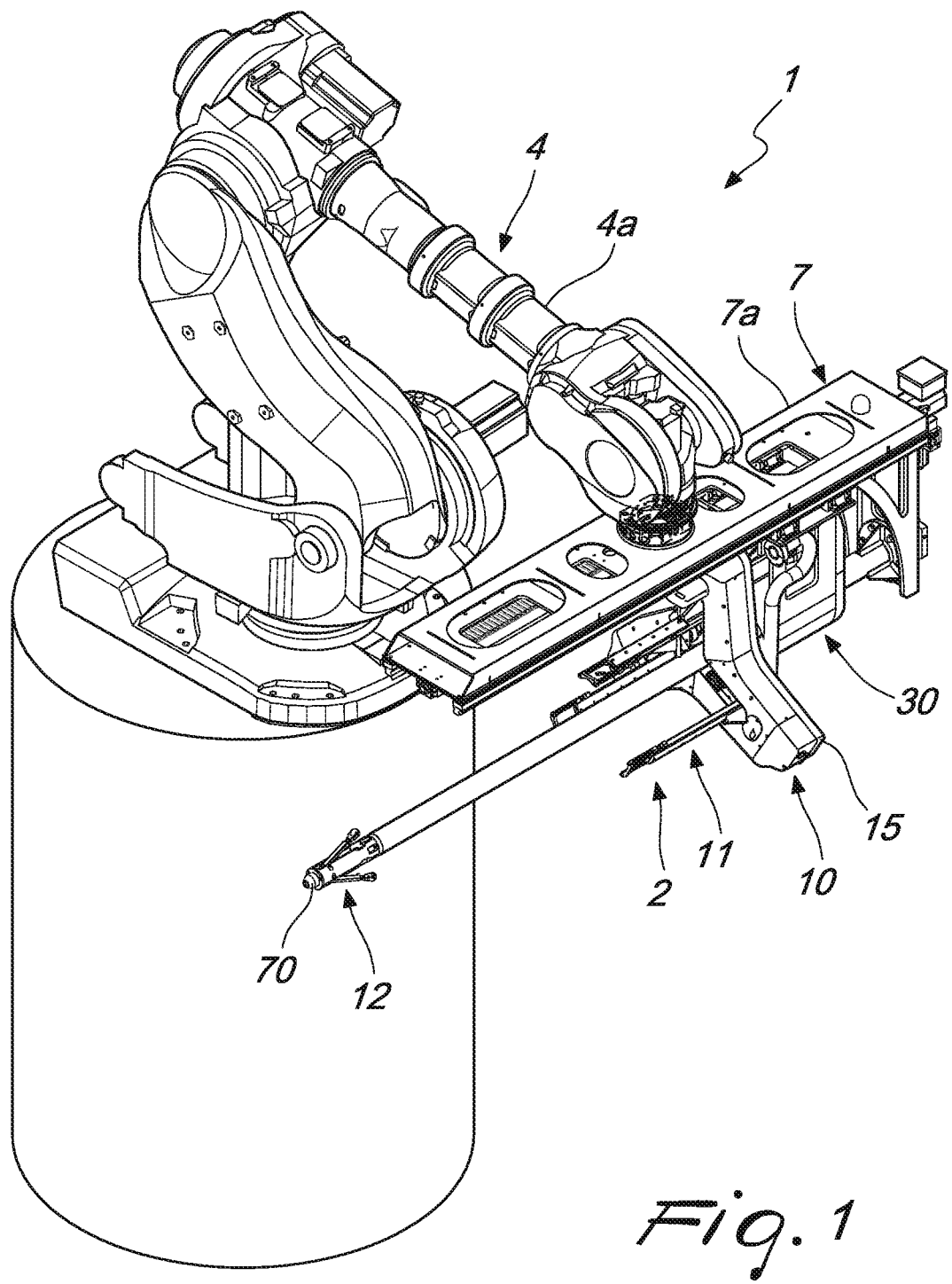
FIG. 1 is a perspective view of the apparatus according to the invention.

With reference to the figures, the apparatus for replacing printing sleeves according to the invention, generally designated by the reference numeral 1, comprises a handling device 2, which can be removably engaged with a printing sleeve 3 to be replaced.

The apparatus according to the invention further comprises a movement robot 4, which is advantageously constituted by an anthropomorphic robot with multiple rotation axes. Alternatively, the movement robot 4 can also be constituted by a Cartesian robot.

The movement robot 4 makes it possible, in particular, to move the handling device 2 between a first position, in which the handling device 2 is arranged proximate and substantially coaxial to a sleeve-holding shaft 5 associated with a printing machine, and a second position, in which the handling device 2 is arranged substantially at a sleeve-holding support 6 of a storage magazine of printing sleeves.

For example, the sleeve-holding support 6 can be constituted by a cylindrical body of shape substantially similar to that of the sleeve-holding shaft 5, which is mounted with its axis arranged substantially horizontally on a rack or other supporting structure, and around which the printing sleeve 3 can be axially fitted.

The printing machine, not shown, can be, for example, a flexographic printing machine provided with a central drum, over which the material in sheet form to be printed passes, and around which a plurality of print assemblies are arranged, each one is provided with a plate roller, arranged adjacent to the central drum and constituted by a sleeve-holding shaft 5 onto which a printing sleeve 3 is fitted which bears the plate on its external lateral surface.

Adjacent to the roller plate of each printing assembly is an anilox roller, whose function is to transfer the ink onto the roller plate and which in turn can be implemented by a second sleeve-holding shaft onto which an anilox sleeve is fitted.

The printing sleeve 3 of the roller plate can, in turn, be constituted by a single sleeve element or it can be provided by two parts coupled together and, in particular, by a tubular holder or carrier sleeve, which provides the necessary rigidity to the printing sleeve, and by a smaller, external printing sleeve, fitted around the carrier sleeve, which constitutes the sleeve plate and which bears the actual plate.

In the present description, the term "printing sleeve" can also mean a carrier sleeve, a sleeve plate or even an anilox sleeve.

Conveniently, on the sleeve-holding shaft 5 there can be, as is per se known, a reference pin, arranged in a preset angular position with respect to the axis of the sleeve-holding shaft and engageable in a corresponding abutment recess, which is defined in the printing sleeve 3 in order to provide a reference point for mounting the printing sleeve 3 in the correct angular position, with respect to the sleeve-holding shaft.

It should be noted that the printing machine is advantageously provided, in a per se known way, with at least one expulsion device, for example of the pneumatic type, which can be actuated on command to move, axially with respect to the sleeve-holding shaft 5, the printing sleeve 3 mounted on the sleeve-holding shaft 5, so as to make it protrude, with an axial portion thereof, from the end of the sleeve-holding shaft 5 located on the side of the printing machine on which the handling device 2 is intended to operate. Advantageously, also at the magazine of printing sleeves, expulsion means can be provided which are capable of acting on the printing sleeves 3 mounted on sleeve-holding supports 6 in order to partially extract the printing sleeve 3 from the corresponding sleeve-holding support 6.

According to the invention, the handling device 2 comprises a supporting frame 7, which is connected to the movement robot 4, in particular, to the free end of the end arm 4a of the movement robot 4.

The supporting frame 7 supports a supporting rod 8, which protrudes in a cantilevered manner from the supporting frame 7.

In particular, the supporting rod 8 can be positioned by the movement robot 4 in a position aligned substantially coaxially with respect to the axis of the sleeve-holding shaft 5 of the printing machine, and can be axially introduced with play into the internal cavity 3a of the printing sleeve 3.

The supporting frame 7 can comprise, for example, a coupling plate-like structure 7a with the movement robot 4, which has a longitudinal extension and can be connected to the movement robot 4 with a face thereof that is designed to be directed upward.

From the opposite face of the coupling plate-like structure 7a, a supporting bracket 7b protrudes advantageously downward and the supporting shaft 8 extends from that, and in turn extends below the plate-like structure 7a and substantially parallel to the longitudinal extension of the latter.

Also according to the invention, the handling device 2 further comprises a self-centering grip clamp 10, which is supported by the supporting frame 7 and is provided with engagement means 11 arranged around the axis of the supporting rod 8.

In particular, the grip clamp 10 is able to move on command, with respect to the supporting frame 7, along a movement direction that is substantially parallel to the axis of the supporting rod 8, between at least one advanced working position, in which the grip clamp 10 is arranged substantially proximate to the free end of the supporting rod 8, and at least one retracted working position, which is arranged spaced apart along the axis of the supporting rod 8 with respect to the advanced working position, in the direction of the other end of the supporting rod 8.

Conveniently, the distance along the axis of the supporting rod 8 between the advanced working position and the retracted working position of the grip clamp 10 is substantially greater than or equal to the length of the printing sleeve 3.

The engagement means 11 of the clamp 10 can, in turn, move on command between at least one inactive position, in which they are closer to the axis of the supporting rod 8, in order to allow their insertion into or extraction from the internal cavity 3a of the printing sleeve 3, and at least one active position, in which they are radially spaced apart from the axis of the supporting rod 8, in order to allow their engagement with the internal surface of the printing sleeve 3.

It should be noted that the extent of the excursion performed by the engagement means 11 in their transition between the inactive position and the active position and, more specifically, the minimum and maximum distance that the engagement means 11 can assume with respect to the axis of the supporting shaft 8, in the transition from the inactive position to the active position, can be set so as to make it possible for the grip assembly 10 to engage, by way of the engagement means 11, printing sleeves 3 of any dimension, in particular printing sleeves 3 that have an inside diameter of any dimension.

Substantially at the free end of the supporting rod 8 there is, advantageously, a supporting assembly 12 for supporting the printing sleeve 3, which is provided with sliding support means 13 which can move on command between a folded or retracted condition, in which they are close to the axis of the supporting rod 8, so as not to interfere with the printing sleeve 3, and an expanded or extended condition, in which they are further away from the axis of the supporting rod 8, so as to be slideably engageable by the internal surface of the printing sleeve 3.

Advantageously, the grip clamp 10 is, furthermore, actuatable in rotation about the axis of the supporting rod 8, in order to facilitate the dismounting and the mounting of the printing sleeve 3 and enable the correct ensheathing thereof on the sleeve-holding shaft 5 of the printing machine or on the sleeve-holding support 6 of the magazine, as will also be explained below.

Figure 5:
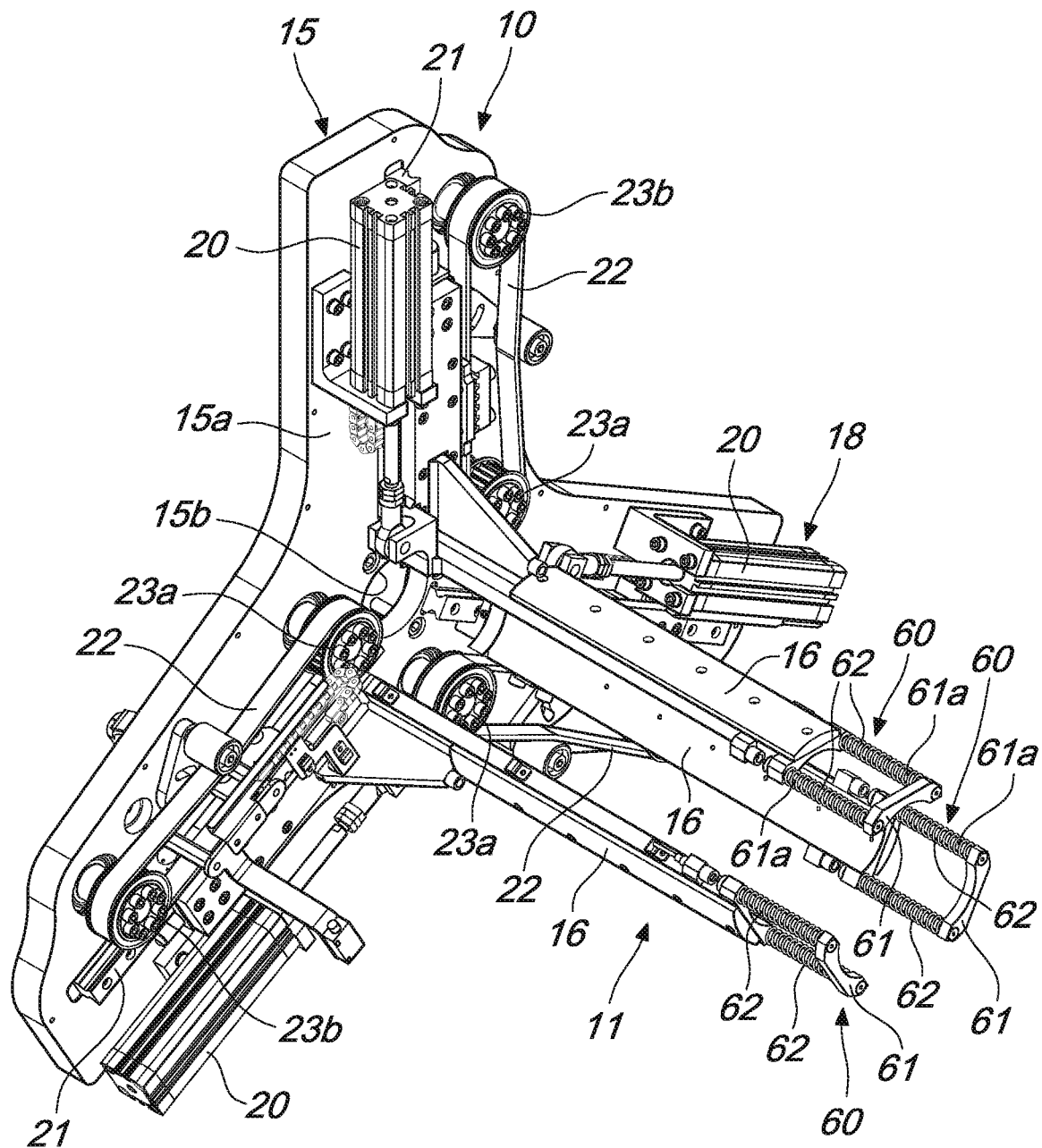
FIG. 5 is a perspective view of a grip clamp of the handling device with parts omitted for the sake of simplicity.

In greater detail, as can be seen in particular in FIG. 5, the grip clamp 10 comprises a base body 15, which is mounted around the supporting rod 8, with the ability to slide along the axis of that supporting rod.

The base body 15 conveniently comprises a sheet-like element 15a, which is, for example, substantially star-shaped or trilobate-shaped, and which is arranged, with its plane of arrangement, substantially perpendicular to the axis of the supporting rod 8.

The sheet-like element 15a also has an opening 15b in the center, which is slideably passed through by the supporting rod 8.

In turn, the engagement means 11 of the grip clamp 10 comprise at least three grip claws 16, which are supported by the base body 15 and are distributed mutually angularly spaced apart, around the axis of the supporting rod 8.

Preferably, the grip claws 16 have an elongated extension along a direction that is substantially parallel to the axis of the supporting rod 8 and protrude in a cantilevered manner from the face of the base body 15 of the clamp 10 that is directed toward the free end of the supporting rod 8.

Preferably, the surface of the grip claws 16 that is designed to come into contact with the internal surface of the printing sleeve 3 is provided with means for increasing the friction between the grip claws 16 and the printing sleeve 3, which are constituted, for example, by a covering made of elastically yielding material, such as rubber or the like.

The grip claws 16 can be moved slideably on command, with respect to the base body 15, in a mutually synchronized manner, by way of actuation means 18, along a respective direction of motion, substantially perpendicular to the axis of the supporting rod 8, so as to obtain the transition of the engagement means 11 from the inactive position to the active position and vice versa.

More specifically, still with reference to FIG. 5, the actuation means 18 of the grip claws 16 comprise, for each grip claw 16, an actuation cylinder 20, supported by the base body 15 and connected with its stem to the associated claw 16, which is mounted so that it can slide on a corresponding sliding guide 21, fixed to the base body 15.

To ensure the synchronization of the movement of the claws 16, each grip claw 16 is connected to a respective belt 22, running in a closed loop between a pair of guide pulleys 23a, 23b that are mounted so that they can rotate on the same side of the base body 15 where the claws 16 are located, with the respective axes arranged substantially parallel to the axis of the supporting rod 8, so as to define two branches of the belt 22 which are substantially parallel to the movement direction of the corresponding claw 16, of which one is integrally connected to the corresponding claw 16.

One of the two guide pulleys, for example the one indicated with 23a, is connected integrally in rotation with a respective synchronization cog wheel 24, located on the side of the base body 15 opposite to the side on which the grip claws 16 are located.

Figure 6:
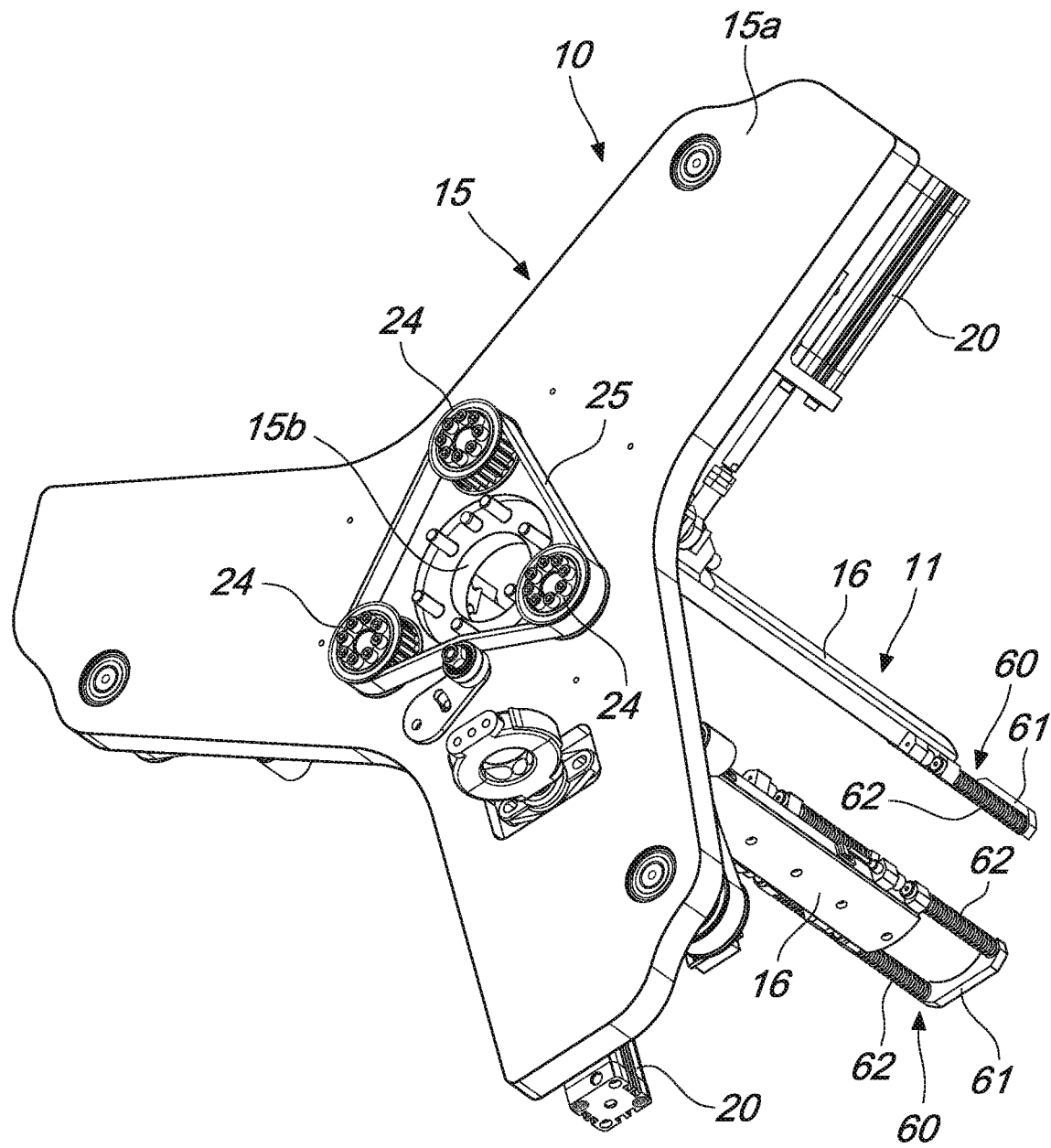
FIG. 6 is a perspective view from a different angle of the grip clamp, again with parts omitted for the sake of simplicity.

As can be seen in FIG. 6, the synchronization cogs 24 of the various grip claws 16 are connected to each other by way of a toothed synchronization belt 25 which meshes with the synchronization cog wheels 24 in order to transmit the movement of each synchronization cog wheel 24 to the others, thus ensuring the synchronization of movement between the grip claws 16.

Advantageously, the grip claws 16 are associated with at least one position sensor, which can be, for example, provided by a linear transducer which is mounted on one of the actuation cylinders 20 in order to identify the exact position of the grip claws 16.

Figure 2:
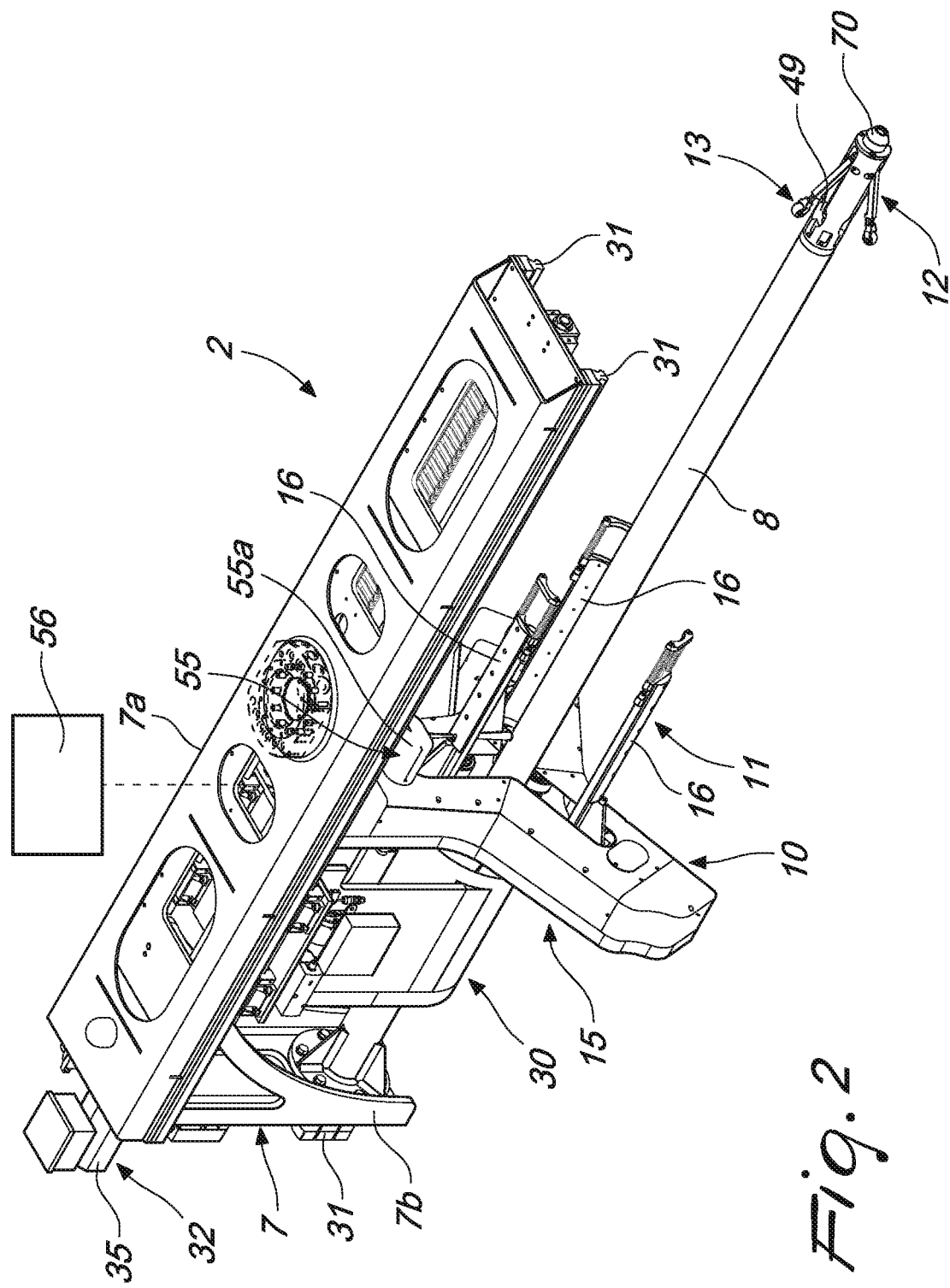
FIG. 2 is a perspective view of a handling device of the apparatus according to the invention.
Figure 3:
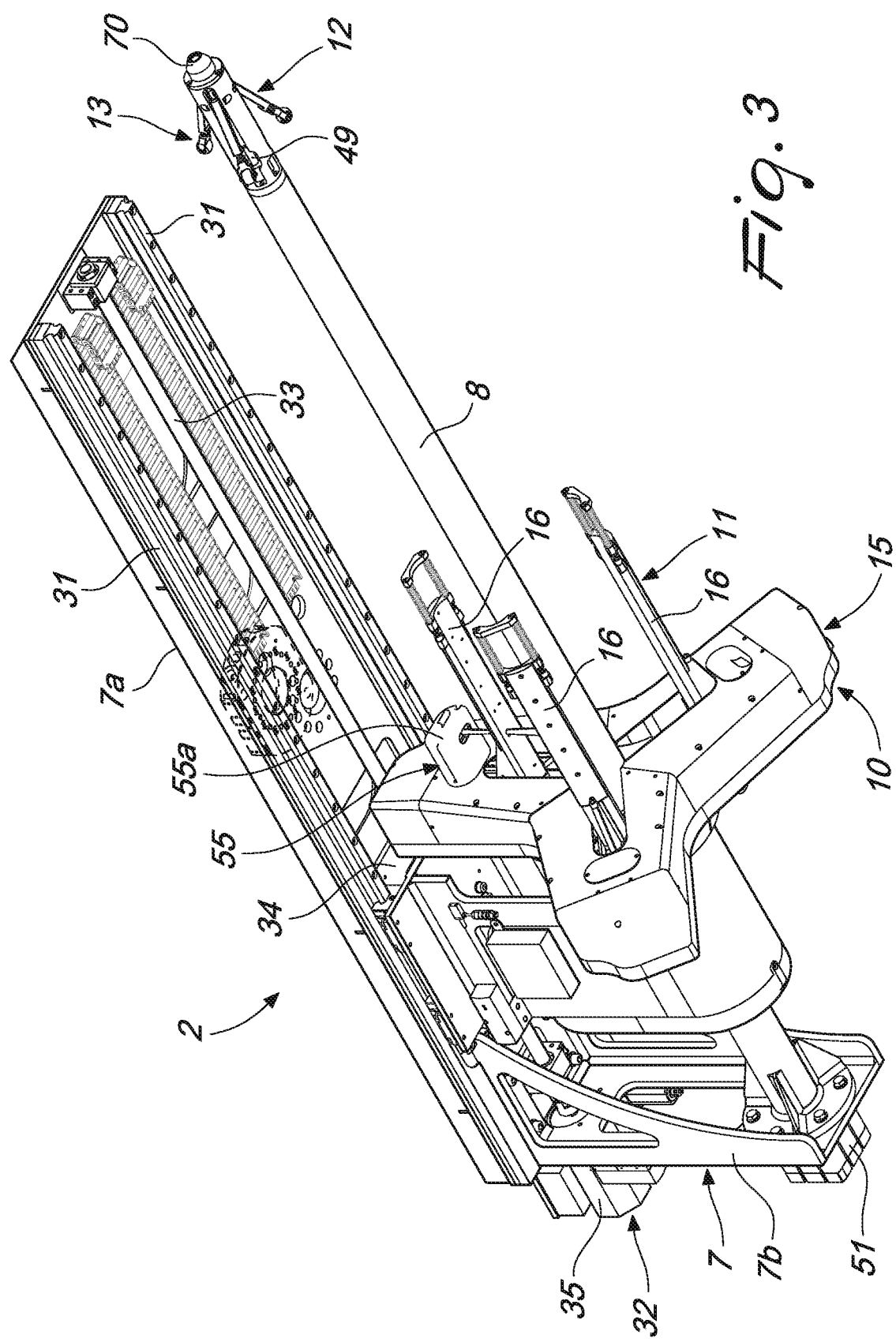
FIG. 3 is a perspective view from a different angle of the handling device.
Figure 4:
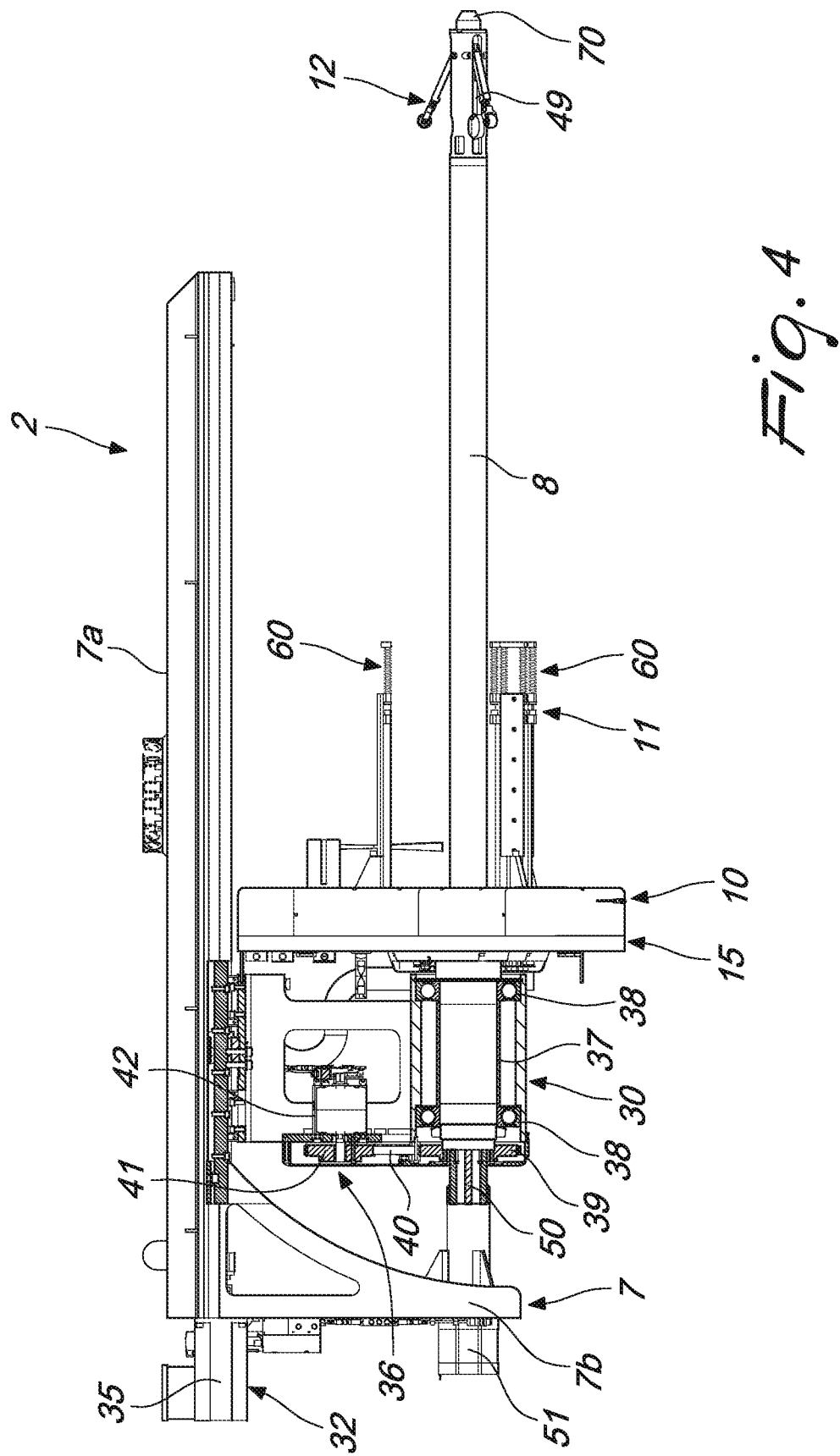
FIG. 4 is a partially cross-sectional side view of the handling device.

With reference in particular to FIGS. 2, 3 and 4, the base body 15 of the grip clamp 10 is, conveniently, supported by a carriage 30, which is slideably mounted along at least one linear guide 31 which is supported by the supporting frame 7 and extends substantially parallel to the axis of the supporting rod 8.

In particular, the carriage 30 is slideably coupled to a pair of linear guides 31, preferably of the prismatic type, which are fixed to the face that is directed toward the supporting rod 8 of the plate-like structure 7a.

More specifically, the carriage 30 is actuatable in translation along the linear guides 31 by movement means 32, which are supported by the supporting frame 7.

As can be seen in FIG. 3, the movement means 32 of the carriage 30 can be, for example, constituted by a preferably recirculating-ball endless screw 33, which is supported so that it can rotate by the plate-like structure 7a. The endless screw 33 is engageable by at least one female thread element 34, integral with the carriage 30, and is actuatable in rotation about its own axis by an electric motor 35 supported by the plate-like structure 7a.

Advantageously, the base body 15 of the grip clamp 10 is actuatable in rotation, about a rotation axis substantially parallel to the axis of the supporting rod 8, with respect to the carriage 30, using motor means 36 which are supported by the carriage 30.

In particular, the sheet-like element 15a of the base body 15 of the grip clamp 10 can rotate with respect to the supporting shaft 8 and is connected, on its side opposite to the grip claws 16, to a hollow rotating shaft 37, which is axially passed through by the supporting rod 8 and is supported so that it can rotate by the carriage 30 by way of the interposition of bearings 38.

As shown in FIG. 4, a kinematic transmission cog wheel 39 is rigidly fixed at the end of the hollow rotating shaft 37 opposite to the end connected to the base body 15 of the grip clamp 10, and a flexible motion transmission element 40 runs around it, such as, for example, a toothed belt, a chain or the like, which is moved by a pinion 41, which in turn is actuated rotationally by an actuation motor 42, supported by the carriage 30 and conveniently constituted by an oscillating rotary pneumatic actuator, capable for example of performing oscillations preferably of around 270° in one direction and in the other.

Figure 7:
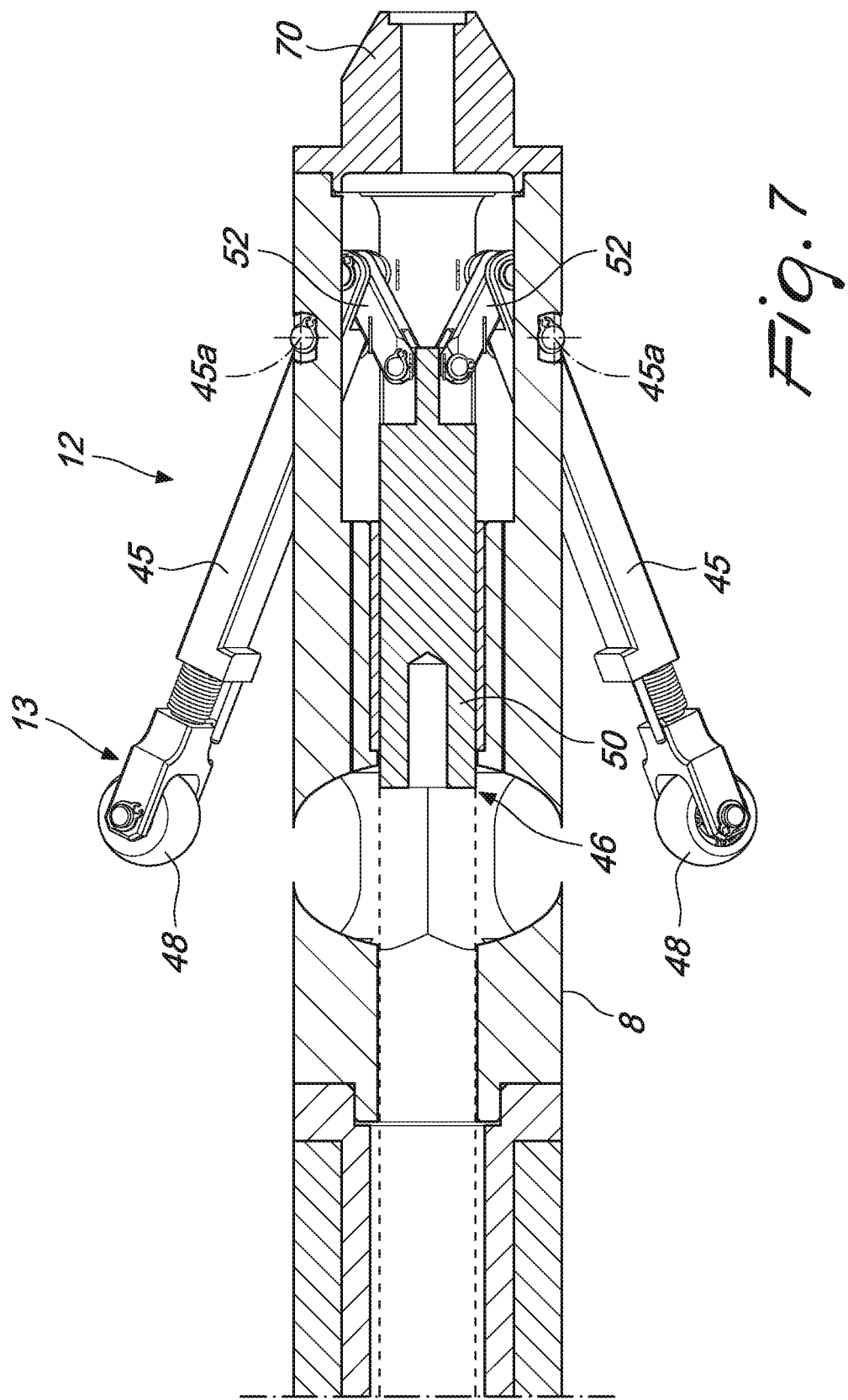
FIGS. 7 and 8 are longitudinal cross-sectional views of a supporting assembly of the handling device in two different positions.
Figure 8:
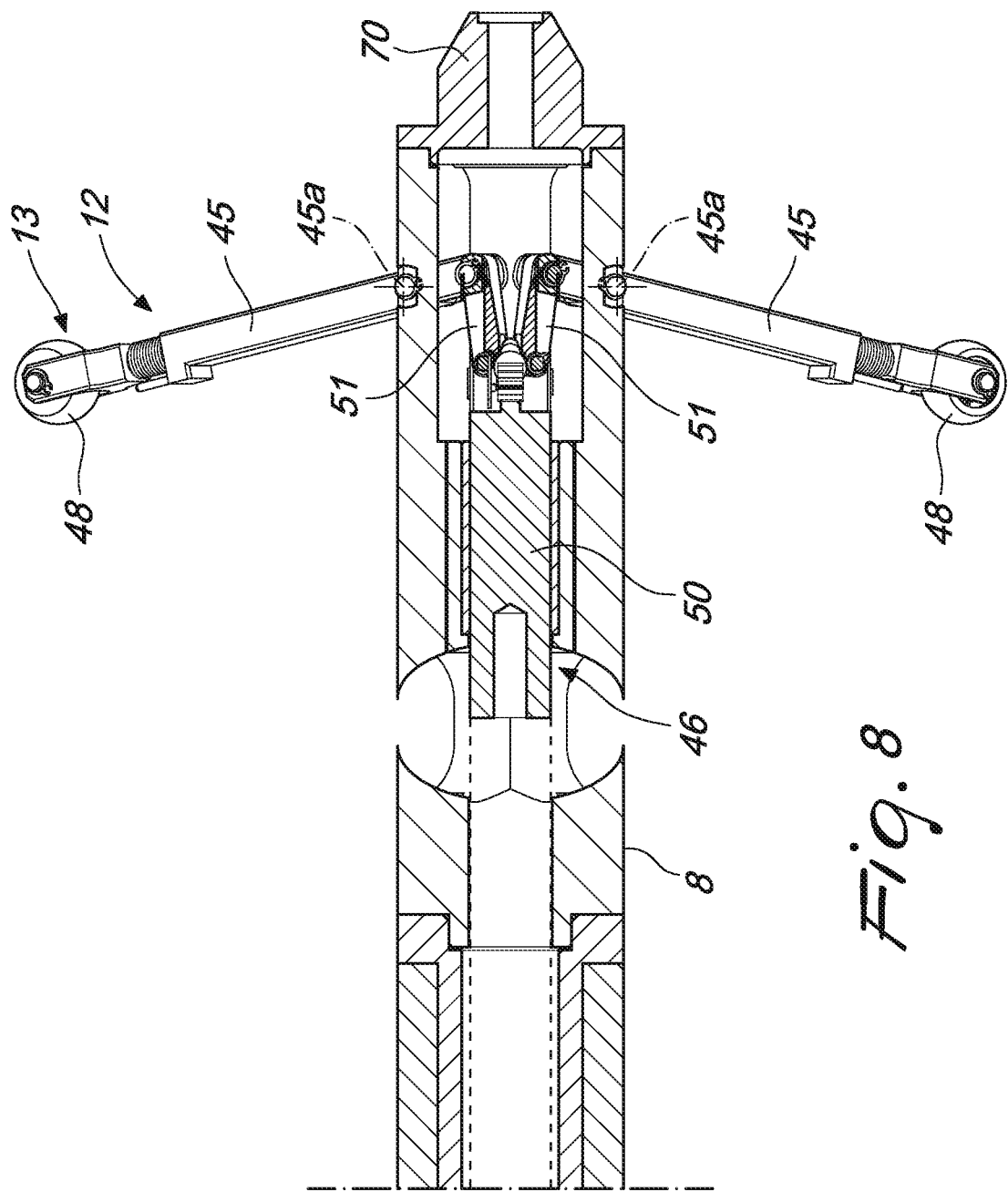

With reference in particular to FIGS. 7 and 8, the above-mentioned supporting assembly 12 and, more specifically, the sliding support means 13 are, advantageously, provided by at least three supporting arms 45, which are distributed around the axis of the supporting rod 8.

Each one of the supporting arms 45 is, in particular, pivoted, at an intermediate portion thereof, to the supporting rod 8, about a respective oscillation axis 45a that is substantially perpendicular to a radial plane that passes through the longitudinal axis of the corresponding supporting arm 45 and through the axis of the supporting rod 8.

The supporting arms 45 are furthermore functionally connected, at an end thereof, to actuation means 46, which are supported by the supporting frame 7 and which can be activated on command in order to cause the rotation of the supporting arms 45 around the respective oscillation axes so as to obtain the transition of the sliding support means 13 from the retracted condition to the extended condition and vice versa.

Advantageously, the supporting arms 45 support, at their end opposite to the end connected to the actuation means 46, a respective supporting wheel 48, which is slideably engageable against the internal surface of the printing sleeve 3.

Conveniently, on the external lateral surface of the supporting rod 8, respective accommodation grooves 49 are defined at each one of the supporting arms 45, and are designed to receive the corresponding supporting arm 45 when the sliding support means 13 are in the folded condition.

Advantageously, the actuation means 46 of the supporting arms 45 are constituted by an actuation rod 50, which is slideably accommodated along the axis of the supporting shaft 8 and is connected, with one of its ends, to a linear actuator 51, such as, for example, a pneumatic cylinder, supported by the supporting frame 7 at the opposite end with respect to the free end of the supporting rod 8, and with its other end to each one of the supporting arms 45, by way of a respective lever mechanism 52.

Advantageously, the grip clamp 10 is provided with position sensing means 55, which are constituted, for example, by a laser sensor, capable of detecting the presence of the printing sleeve 3 proximate to the grip clamp 10.

Conveniently, the position sensing means 55 are, furthermore, structured to allow the possibility of measuring the diameter of the printing sleeve 3 and have, advantageously, a detector 55a, which is positioned protruding from the base body 15 of the grip clamp 10, so as to be spaced apart axially with respect to the face of the sheet-like element 15a on which the grip claws 16 are located, and which is arranged so as to be able to face toward the external surface of the printing sleeve, in order to be able to detect its presence, when the grip clamp 10 is brought to its advanced position.

In particular, such position sensing means 55 are functionally connected to control means 56, which are constituted, conveniently, by an electronic controller, which is mounted, preferably, on the supporting frame 7.

The control means 56 are configured to drive the movement means 32 of the carriage 30 that supports the grip clamp 10, as a function of the signals arriving from the position sensing means 55, so as to command the arrest of the carriage 30, during the movement of the grip clamp 10 from the retracted working position to the advanced working position, upon the detection, by the position sensing means 55, of the presence of the printing sleeve 3 proximate to that grip clamp.

Advantageously, the control means 56 are also functionally connected to the position sensor of the grip claws 16, so as to enable the control means 56 to detect, as a function of the signals originating from the position sensor, the arrest of the grip claws 16, during their movement from the inactive position to the active position, after the grip claws 16 have come into contact with the internal surface of the printing sleeve 3 with the consequent stop of the movement of those grip claws.

Conveniently, the grip clamp 10 is further fitted with pressure sensing means, which are in turn functionally connected to the control means 56 and are designed to detect the pressing exerted by the grip claws 16 against the internal surface of the printing sleeve 3.

In particular, the control means 56 are configured to drive the actuation means 18 of the grip claws 16, as a function of the signals arriving from the pressure sensing means.

More specifically, the control means 56 are, advantageously, configured to command the actuation means 18 of the grip claws 16, so that the contact pressure exerted by the grip claws 16 against the internal surface of the printing sleeve 3 and detected by the pressure sensing means is proportional to the thickness of the printing sleeve 3.

It should be noted that the value of the thickness of the printing sleeve 3 can be calculated by the control means 56 on the basis of the signals supplied by the position sensor of the grip claws 16 and on the basis of the measurement of the outside diameter of the printing sleeve 3, which can be supplied by the position sensing means 55 of the carriage 30.

Advantageously, according to the preferred embodiment, the pressure sensing means are provided by an electro-pneumatic transducer adapted to detect the feed pressure of the actuation cylinders 20 of the grip claws 16, while the control means 56 are configured to drive a solenoid valve that makes it possible to adjust the feed pressure of the actuation cylinders 20 so that it is proportional to the value of the thickness of the printing sleeve 3 calculated by those control means.

The force with which the sliding support means 13 are brought from the retracted position to the extended position can also be controlled by way of an electro-pneumatic transducer which makes it possible to adjust the feed pressure of the linear actuator 51 as a function of the thickness of the printing sleeve 3, calculated by the control means 56.

Conveniently, the grip claws 16 have elastic pusher means 60, which are engageable against the end of the printing sleeve 3 that is designed to be directed toward the handling device 2.

As can be seen in particular in FIG. 5, such elastic pusher means 60 comprise, for example, for each grip claw 16, a respective pusher pad 61, facing the free end of the corresponding grip claw 16, and slideably connected to the corresponding grip claw 16, for example by way of a pair of supporting bars 61a.

The pusher pad 61 is elastically loaded by springs 62, which are mounted around the supporting bars 61a and interposed between the pusher pad 61 and the corresponding grip claw 16, and which act in the direction which is adapted to keep the pusher pad 61 in the position spaced apart from the corresponding grip claw 16.

Advantageously, at the free end of the supporting rod 8 there are axial coupling means which are removably engageable with the axial shank of the sleeve-holding shaft 5 of the printing machine at which the handling device 2 is positioned by the movement robot 4, so as to ensure the coaxial arrangement between the supporting rod 8 and the sleeve-holding shaft 5.

Preferably, such axial coupling means comprise an engagement pin 70, which conveniently is frustum-shaped and protrudes axially from the free end of the supporting rod 8.

The engagement pin is removably engageable in an engagement seat 71, which is correspondingly shaped and defined axially in the axial shank of the sleeve-holding shaft 5.

Conveniently, such axial coupling means can furthermore be coupled removably with an axial element 72, shaped like a shank, which is provided at the end of the sleeve-holding support 6 of the magazine from which the printing sleeve 3 is unseated or seated.

The operation of the apparatus according to the invention is the following.

Figure 9:
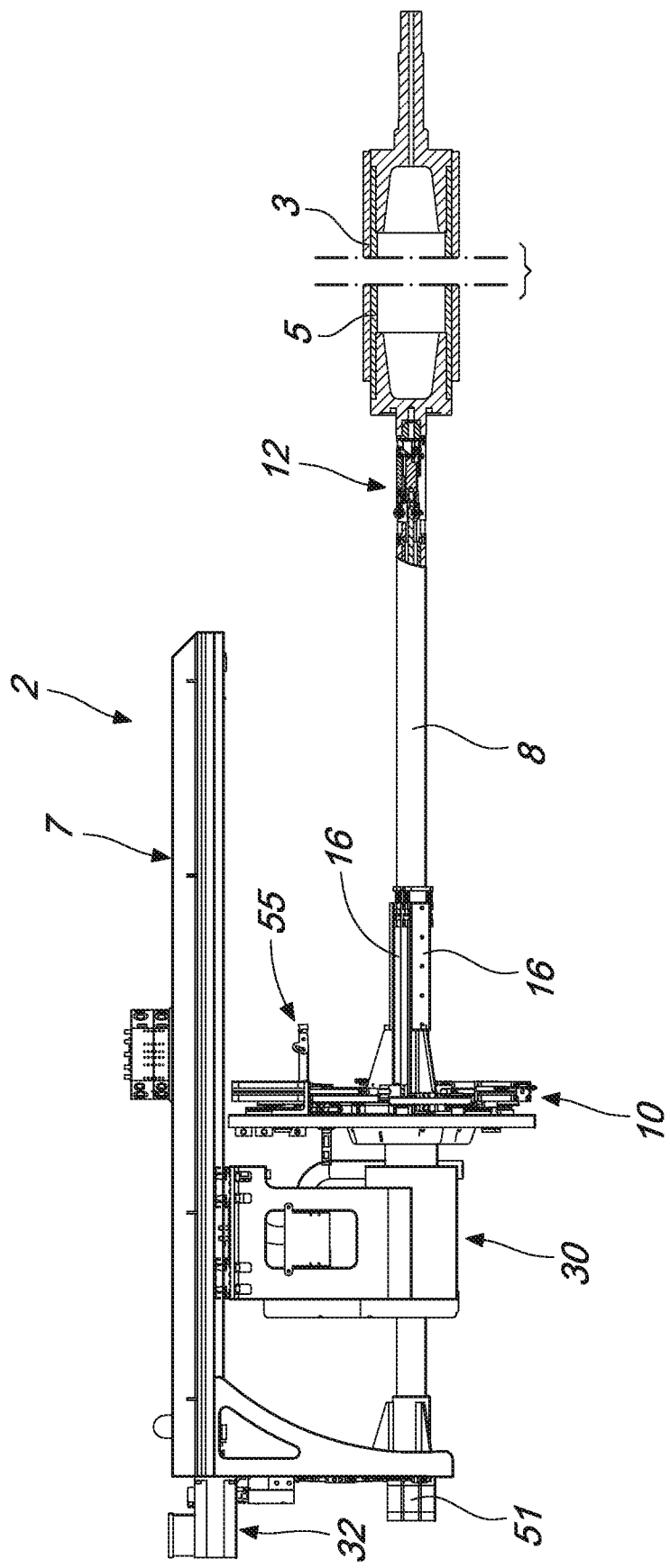
FIGS. 9 to 26 are partially cutaway side views of the handling device in a sequence of steps of operation of the apparatus according to the invention.

With reference to FIGS. 9 to 17, in order to extract a printing sleeve 3 from a sleeve-holding shaft 5 of the printing machine and ensheathe it onto a sleeve-holding support 6 of the magazine, the movement robot 4 initially brings the handling device 2 to the first position, so that it is arranged at the sleeve-holding shaft 5 that supports the printing sleeve 3 to be extracted, and positions the supporting rod 8 so as to mate the free end of the supporting rod 8 with the axial shank of the sleeve-holding shaft 5, as shown in FIG. 9.

In this step, the sliding support means 13 of the supporting assembly 12 are in the retracted condition and the grip clamp 10 is in the retracted working position.

Figure 10:
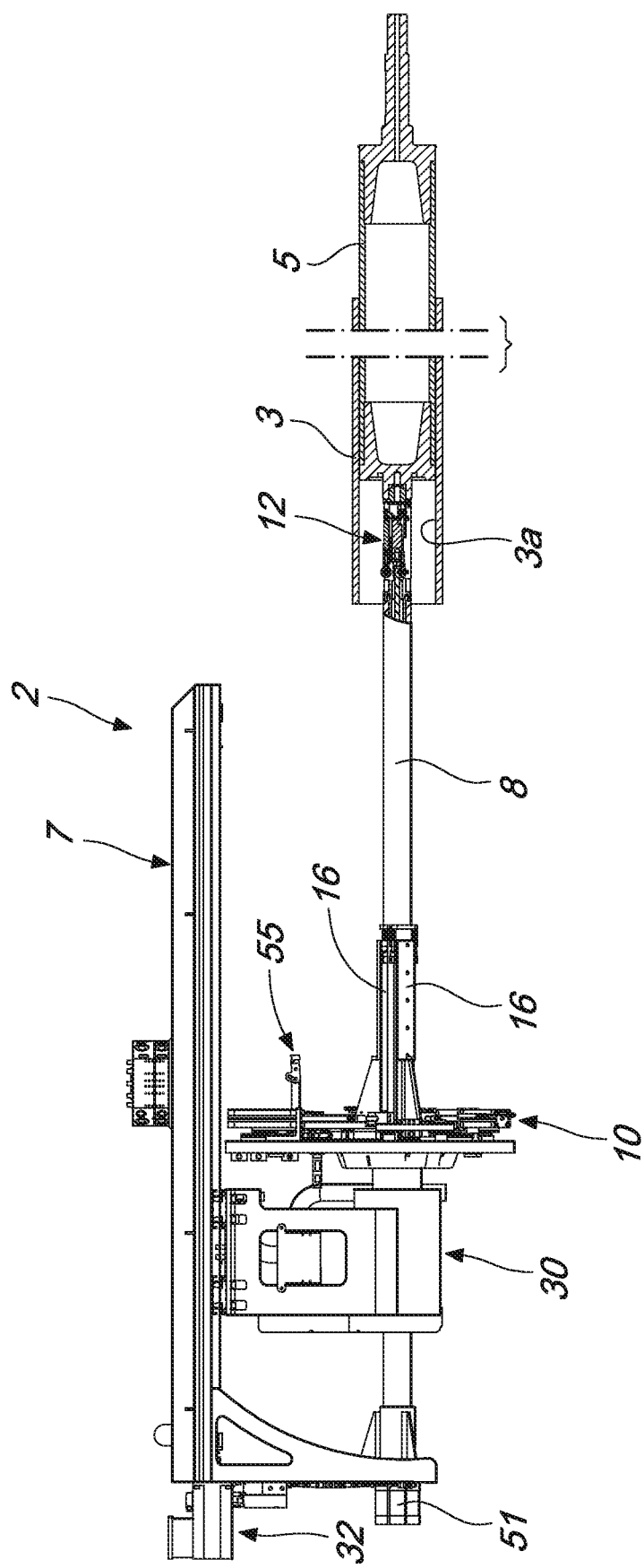

Then, the expulsion device of the printing machine is activated so that an axial portion of the printing sleeve 3 is made protrude with respect to the end of the sleeve-holding shaft 5 directed toward the handling device 2, as shown in FIG. 10.

At this point, with the engagement means 11 of the grip clamp 10 in the inactive position, the movement means 32 of the carriage 30 are activated so as to move the grip clamp 10 from the retracted working position to the advanced working position, so as to insert the grip claws 16 into the internal cavity 3a of the printing sleeve 3.

When the position sensing means 55 detect the presence of the printing sleeve 3 proximate to the grip clamp 10, the control means 56 command the deactivation of the movement means 32 of the carriage 30, so as to arrest the movement of the grip clamp 10.

Figure 11:
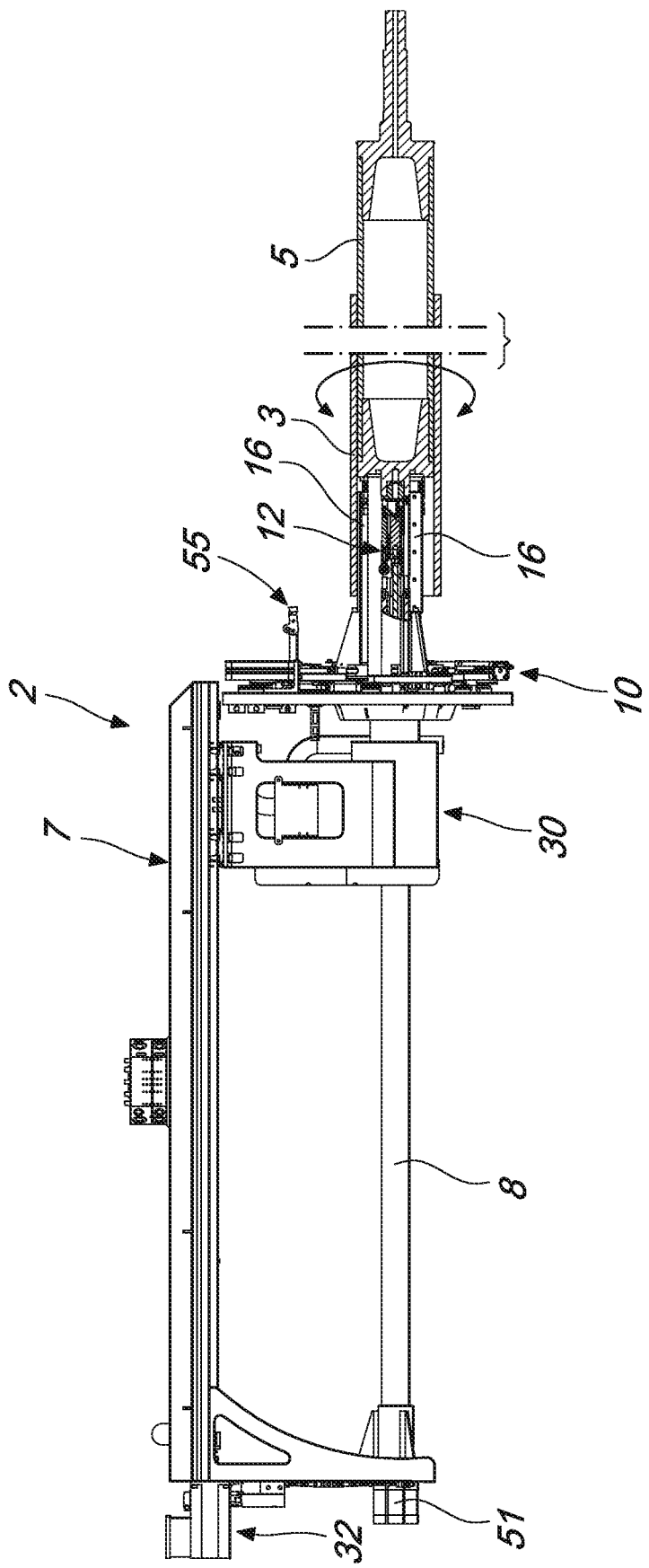

At this point, the actuation means 18 of the grip claws 16 are activated so as to bring the engagement means 11 of the grip clamp 10 from the inactive position to the active position, as illustrated in FIG. 11.

Once the grip claws 16 have made contact with the printing sleeve 3, they stop, since they cannot move further, and their arrest is detected by the control means 56 on the basis of the signals arriving from the position sensor of those grip claws.

At this point, on the basis of the signals arriving both from the position sensing means 55 and from the position sensor of the grip claws 16, the control means 56 calculate the value of the thickness of the printing sleeve 3 and command the actuation means 18 of the grip claws 16, so that the contact pressure exerted by the grip claws 16 against the internal surface of the printing sleeve 3 will have a value proportional to the value of the thickness of the printing sleeve 3.

More specifically, the control means 56 act on the solenoid valve that adjusts the feed pressure of the actuation cylinders 20 of the grip claws 16, until the electro-pneumatic transducer (which detects the feed pressure of the actuation cylinders 20) detects that the value of the feed pressure of the actuation cylinders 20 has been reached that will ensure the desired contact pressure exerted by the grip claws 16 against the internal surface of the printing sleeve 3, proportional to the thickness of the printing sleeve.

Subsequently, the movement means 32 are activated to move the carriage 30 so as to bring the grip clamp 10 to the retracted position.

While the carriage 30 executes this movement, the actuation motor 42 can optionally be activated in order to make the grip clamp 10 perform a rotation about the axis of the supporting rod 8, in order to bring the abutment recess of the printing sleeve 3 to a preset angular position, with respect to the axis of the printing sleeve 3.

It is also possible to actuate the grip clamp 10 in rotation, alternately in one direction and in the other, about the axis of the supporting rod 8, during the movement of the grip clamp 10 to its retracted working position, in order to facilitate the extraction of the printing sleeve 3 from the sleeve-holding shaft 5.

Also during the movement of the carriage 30 that brings the grip clamp 10 to the retracted position, the linear actuator 51 of the supporting assembly 12 is actuated so as to bring the sliding support means 13 of the supporting assembly 12 from the retracted position to the extended position, so that the internal surface of the printing sleeve 3 can slide on the supporting wheels 48.

Figure 12:
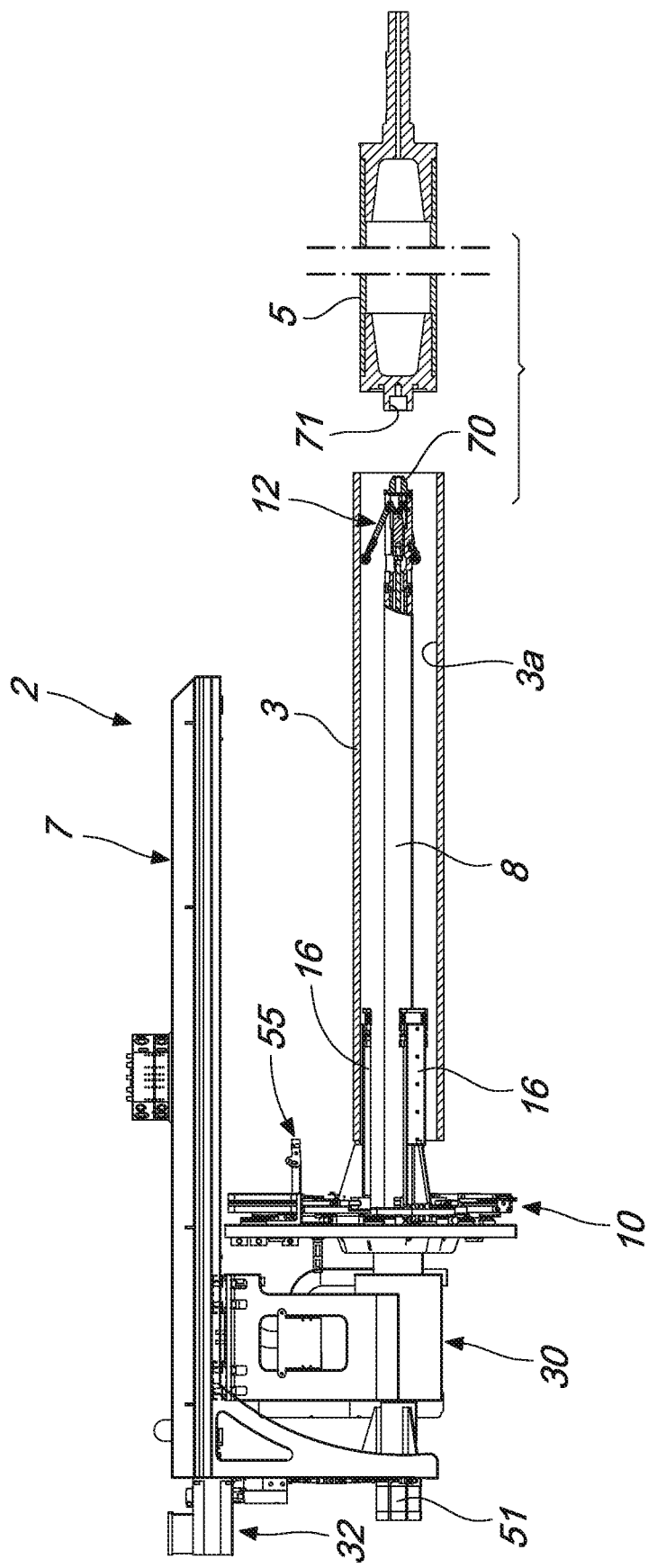

Once the carriage 30 has brought the grip clamp 10 to the retracted working position, the printing sleeve 3 is completely extracted from the sleeve-holding shaft 5 and loaded on the handling device 2, as shown in FIG. 12.

The movement robot 4 then brings the handling device 2 to the second position so that the printing sleeve 3 that was extracted from the printing machine can be ensheathed onto a sleeve-holding support 6 present in the magazine.

Figure 13:
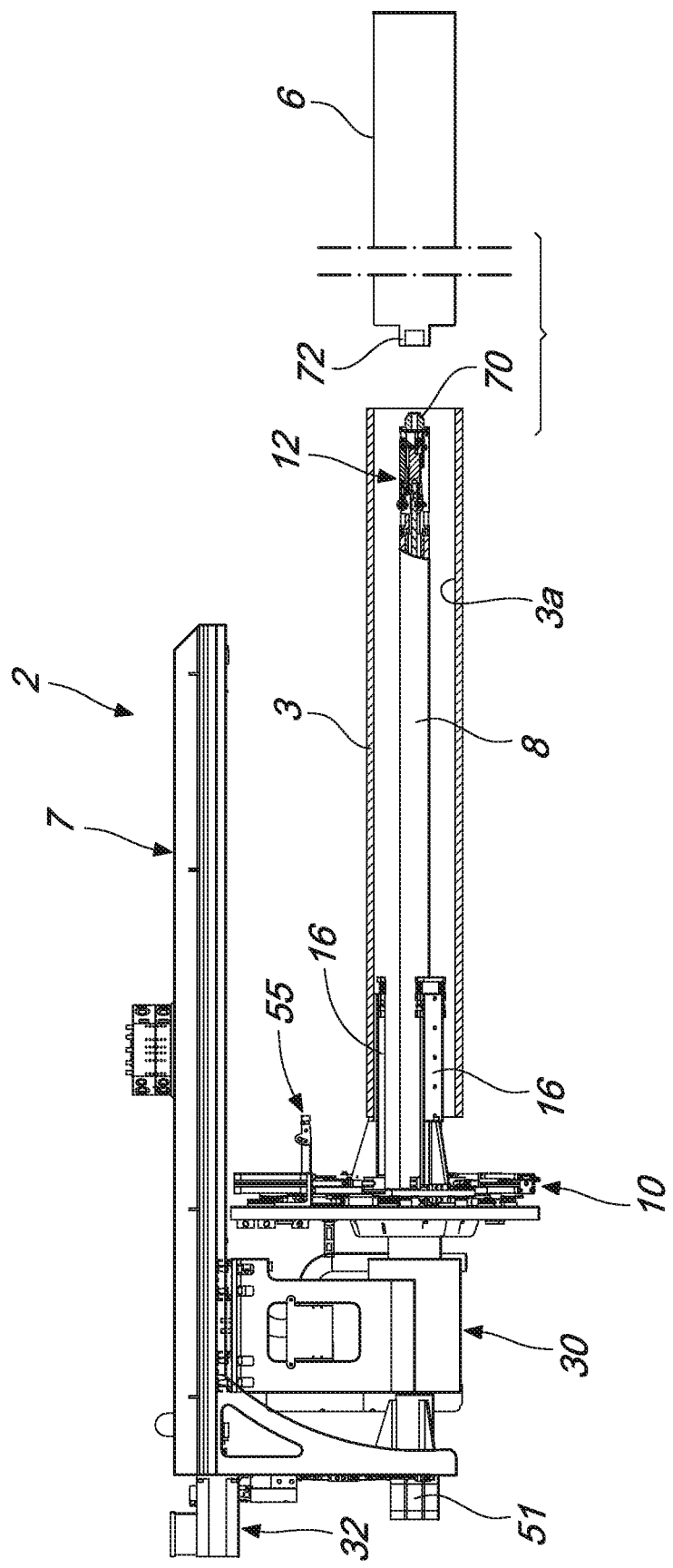

In this step, the sliding support means 13 are brought back to the retracted position, in order to prevent bending of the supporting rod 8 which could compromise the coupling between the supporting rod 8 and the sleeve-holding support 6, as shown in FIG. 13.

Figure 14:
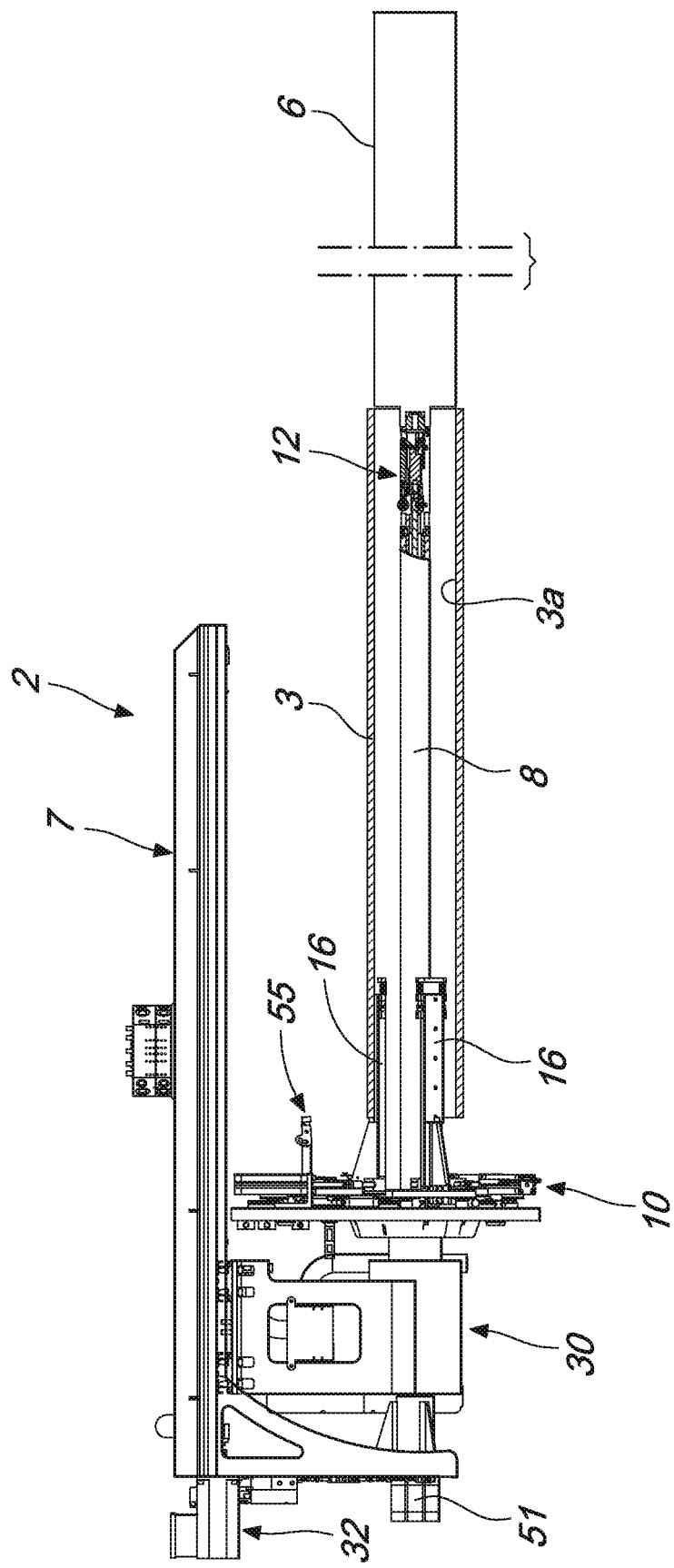

The movement robot 4 then deploys the handling device 2 to engage the free end of the supporting rod 8 with the axial element 72 provided on the sleeve-holding support 6, as shown in FIG. 14.

Figure 15:
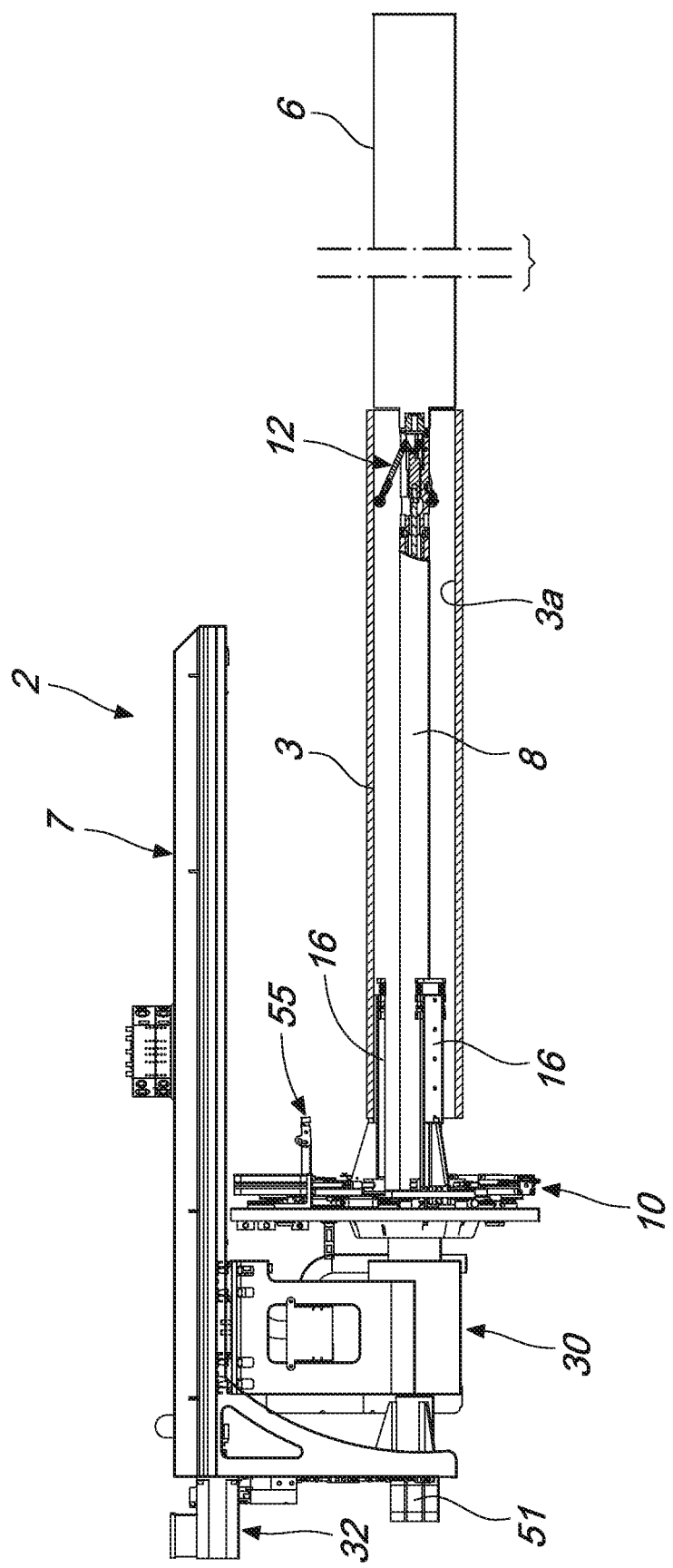

At this point, the linear actuator 51 of the supporting assembly 12 is activated, so as to bring the sliding support means 13 of the supporting assembly 12 from the retracted position to the extended position, in order to ensure that the printing sleeve 3 is centered with respect to the sleeve-holding support 6, as shown in FIG. 15.

Subsequently, the movement means of the carriage 30 are activated, so as to move the grip clamp 10 to the advanced working position and so begin ensheathing the printing sleeve 3 onto the sleeve-holding support 6 of the magazine.

Figure 16:
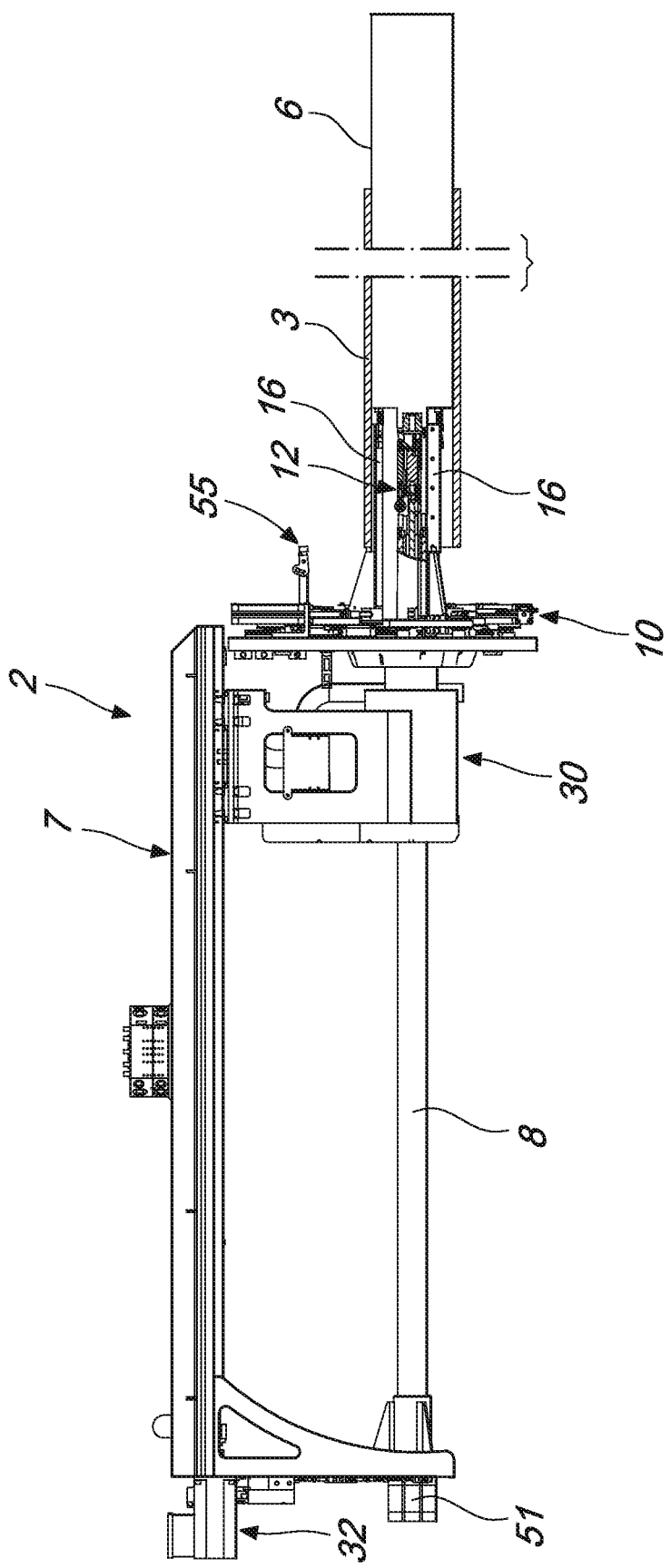

Immediately after the departure of the carriage 30, or in any case once engagement of the printing sleeve 3 with the sleeve-holding support 6 has begun, the linear actuator 51 is actuated so as to bring the sliding support means 13 of the supporting assembly 12 back from the extended position to the retracted position, in order to prevent their collision with the grip clamp 10, as can be seen in FIG. 16.

The carriage 30 continues in its movement, so as to fit the printing sleeve completely over the sleeve-holding support 6 and, once the stroke limit has been reached, the grip claws 16 of the grip clamp 10 are returned to the inactive position, so as to allow the printing sleeve to remain on the sleeve-holding support 6 of the magazine.

Figure 17:
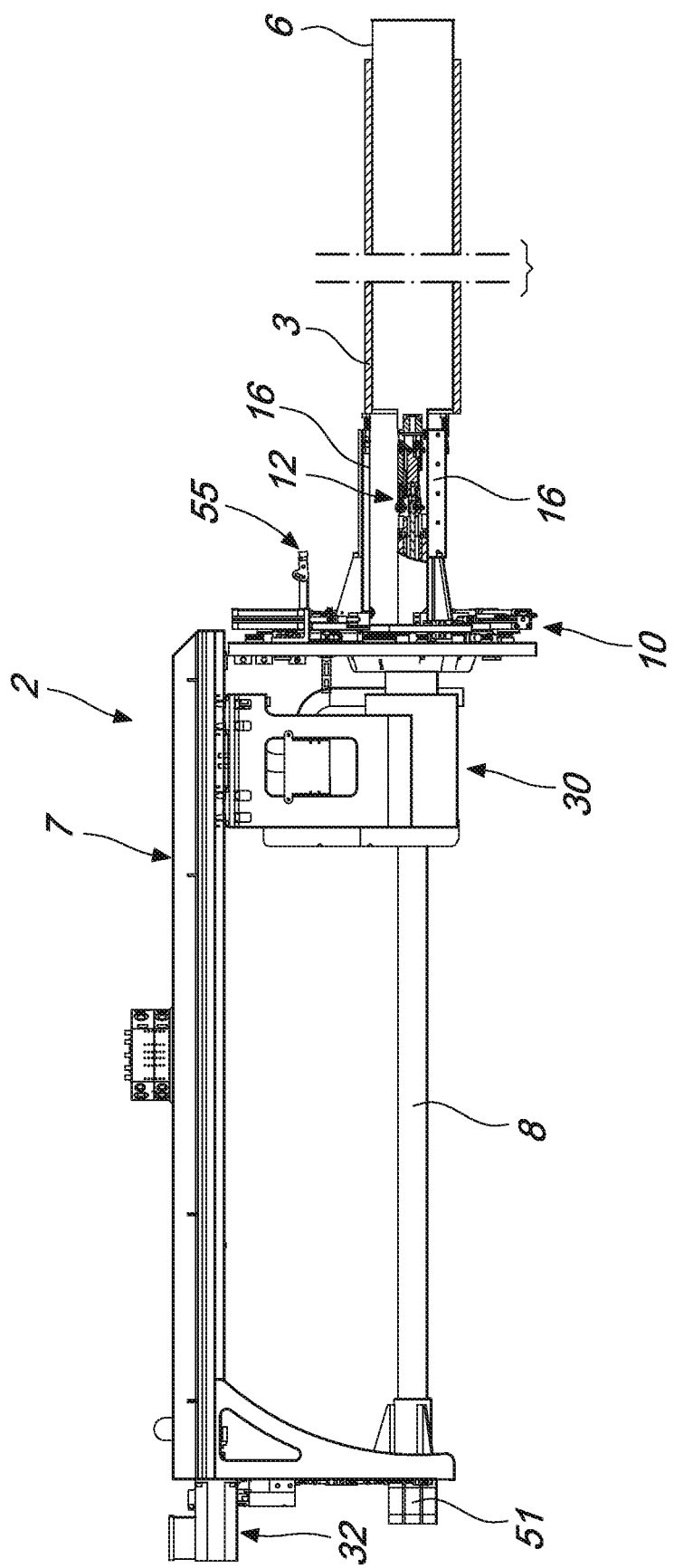

Optionally, after bringing the grip claws 16 to the inactive position and after moving the grip clamp 10 to the retracted working position, until the grip claws 16 are extracted from the internal cavity 3a of the printing sleeve 3, the grip claws 16 of the grip clamp 10 can be moved to the active position until the corresponding elastic pusher means 60 are brought to a position facing the end face of the printing sleeve 3 and subsequently the carriage 30 is actuated so as to move the grip clamp 10 to the advanced working position in order to engage the elastic pusher means 60 of the grip claws 16 against the end face of the printing sleeve 3, until the printing sleeve 3 is ensheathed onto the sleeve-holding support 6 is completed, as shown in FIG. 17.

With reference to FIGS. 18 to 26, if a printing sleeve 3 is to be extracted from the magazine and ensheathed onto a sleeve-holding shaft 5 of a printing assembly of the printing machine, the movement robot 4 initially brings the handling device 2 to the second position, so that the handling device 2 can be at the sleeve-holding support 6 on which the printing sleeve 3 to be extracted is located, and deploys the supporting rod 8 of the handling device 2 so as to engage the free end of the supporting rod 8 with the axial shank of the sleeve-holding support 6.

Figure 18:
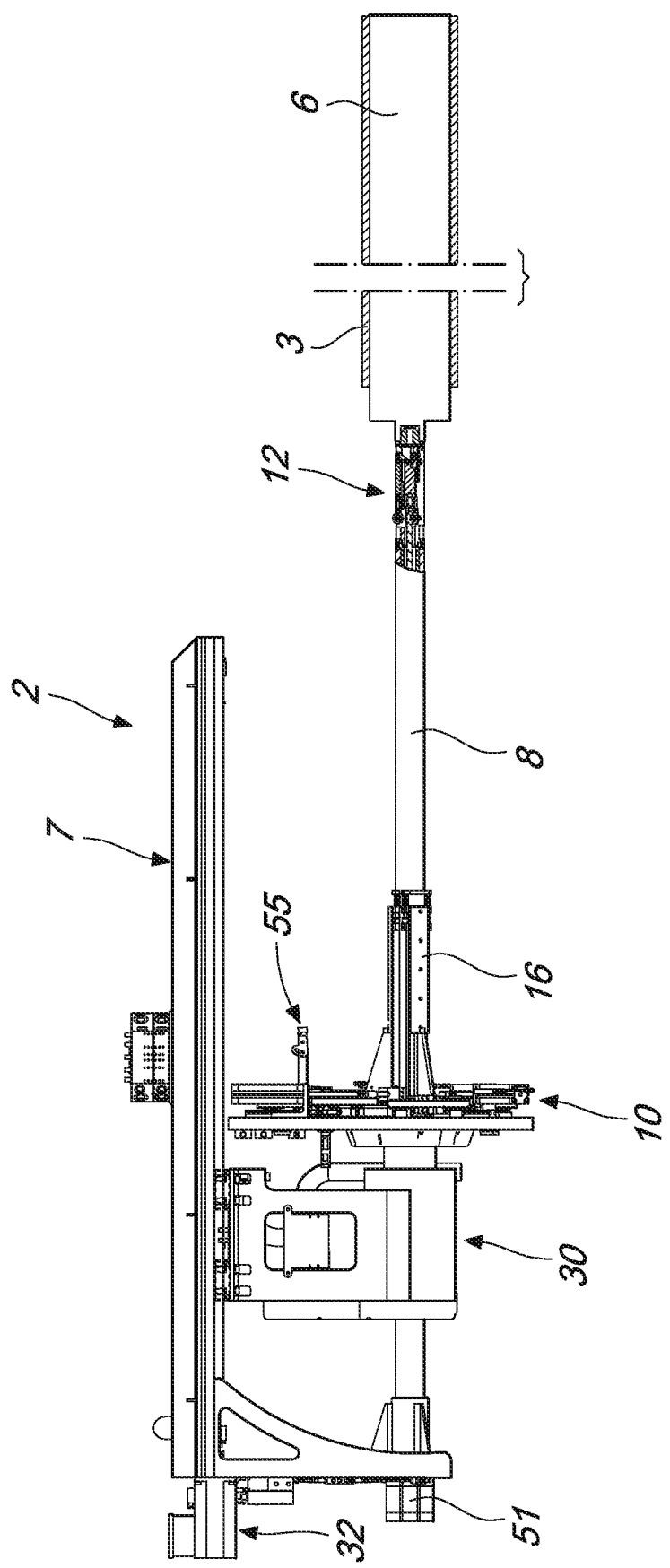

In this step, the sliding support means 13 of the supporting assembly 12 are in the folded condition, as shown in FIG. 18.

Figure 19:
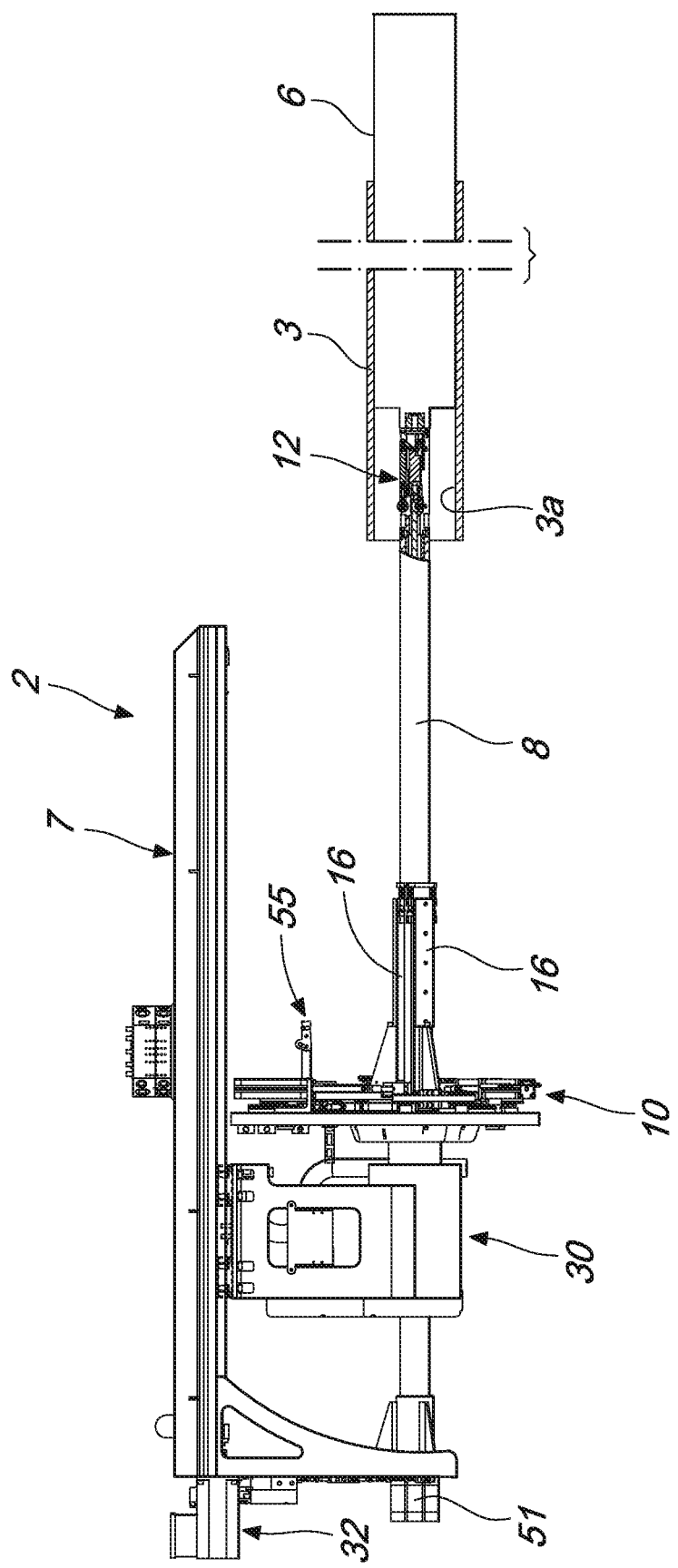

If necessary the means of expulsion of the magazine are activated, so as to partially extract the printing sleeve 3 from the sleeve-holding support 6, as shown in FIG. 19.

At this point, with the grip claws 16 of the grip clamp 10 in the inactive position, the movement means 32 of the carriage 30 are activated in order to begin the movement of the grip clamp 10 from the retracted working position to the advanced working position.

Figure 20:
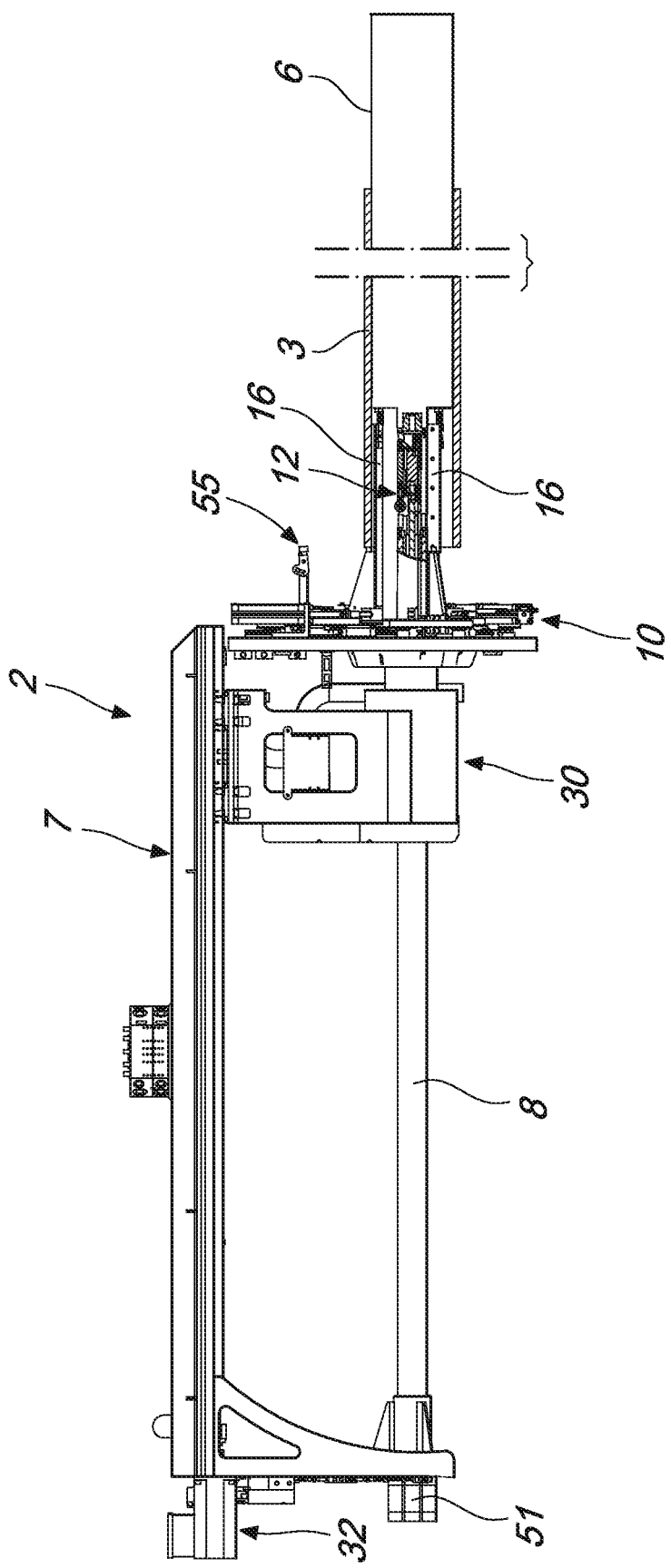

As shown in FIG. 20, when the position sensing means 55 detect the presence of the printing sleeve 3 proximate to the grip clamp 10, the movement of the carriage 30 is stopped and the grip claws 16 are moved to their active position, until the printing sleeve 3 becomes locked with respect to the grip clamp 10, with a contact pressure between the grip claws 16 and the internal surface of the printing sleeve 3 that is proportional to the thickness of that printing sleeve.

Figure 21:
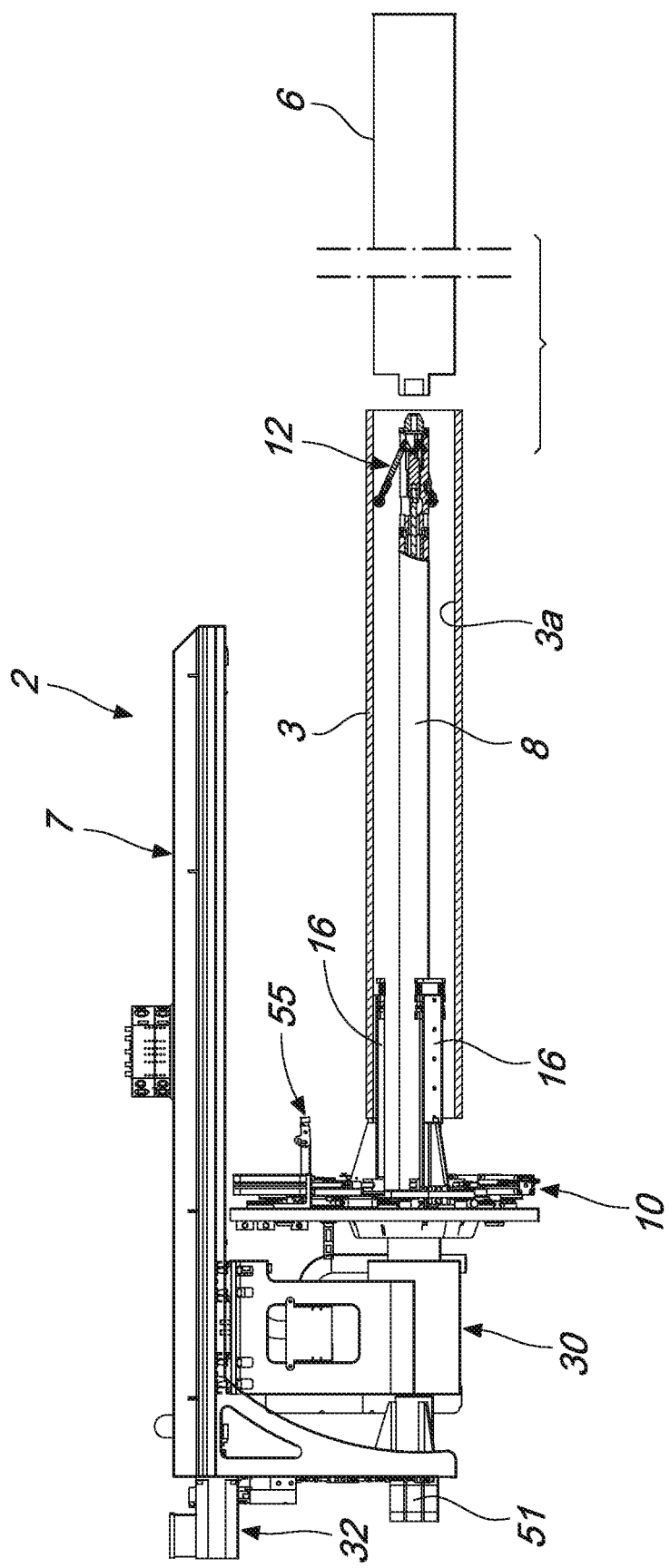
Figure 22:
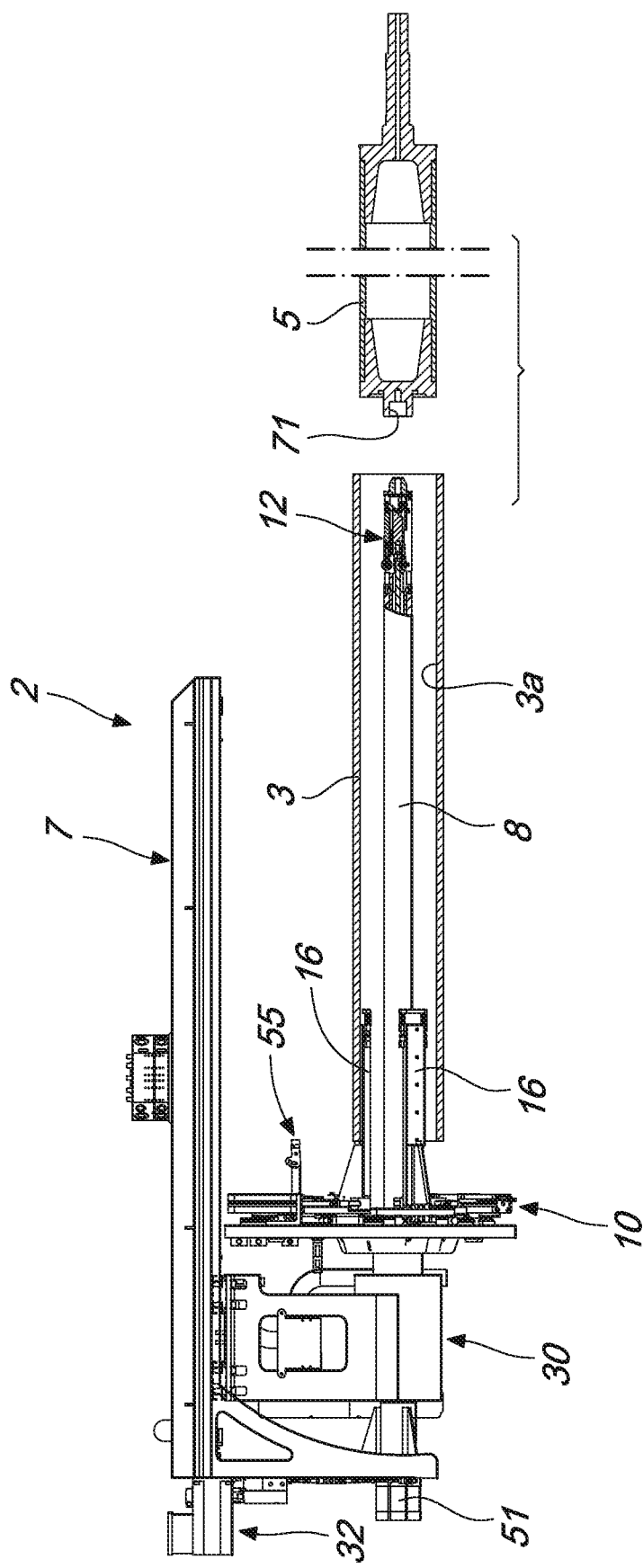

At this point, the carriage 30 is moved so as to move the grip clamp 10 to its retracted working position and, during this movement, the sliding support means 13 are brought to the extended condition, so that the supporting wheels 48 can slideably engage the internal surface of the printing sleeve 3, until the printing sleeve 3 is completely extracted from the sleeve-holding support 6 of the magazine, as shown in FIG. 21.

Figure 23:
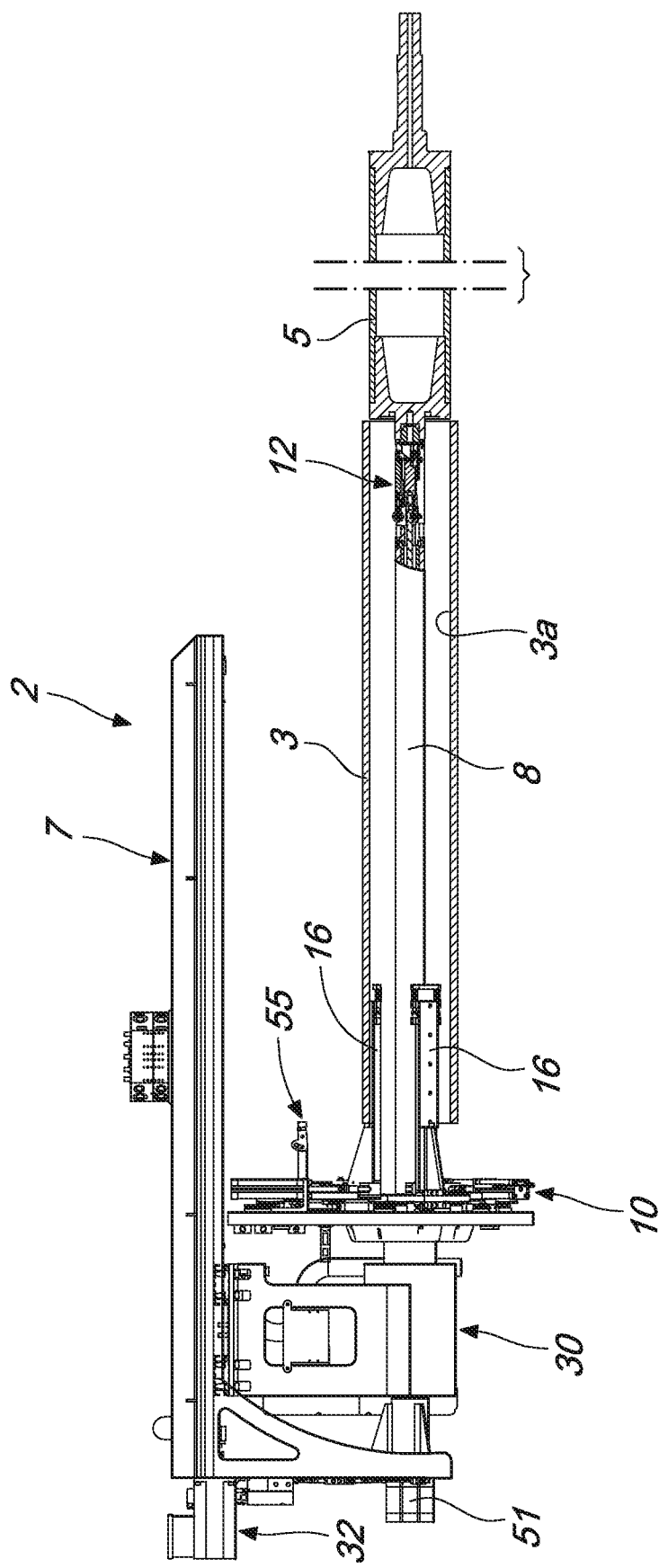

The movement robot 4, with the sliding support means 13 in the folded condition, in order to prevent bending of the supporting rod 8, at this point brings the handling device 2 to the first position, so as to position it at the sleeve-holding shaft 5 that is adapted to receive the printing sleeve 3 that was extracted from the magazine, and deploys the supporting rod 8 of the handling device 2 so as to mate its free end with the axial shank of the sleeve-holding shaft 5, as shown in FIG. 23.

Figure 24:
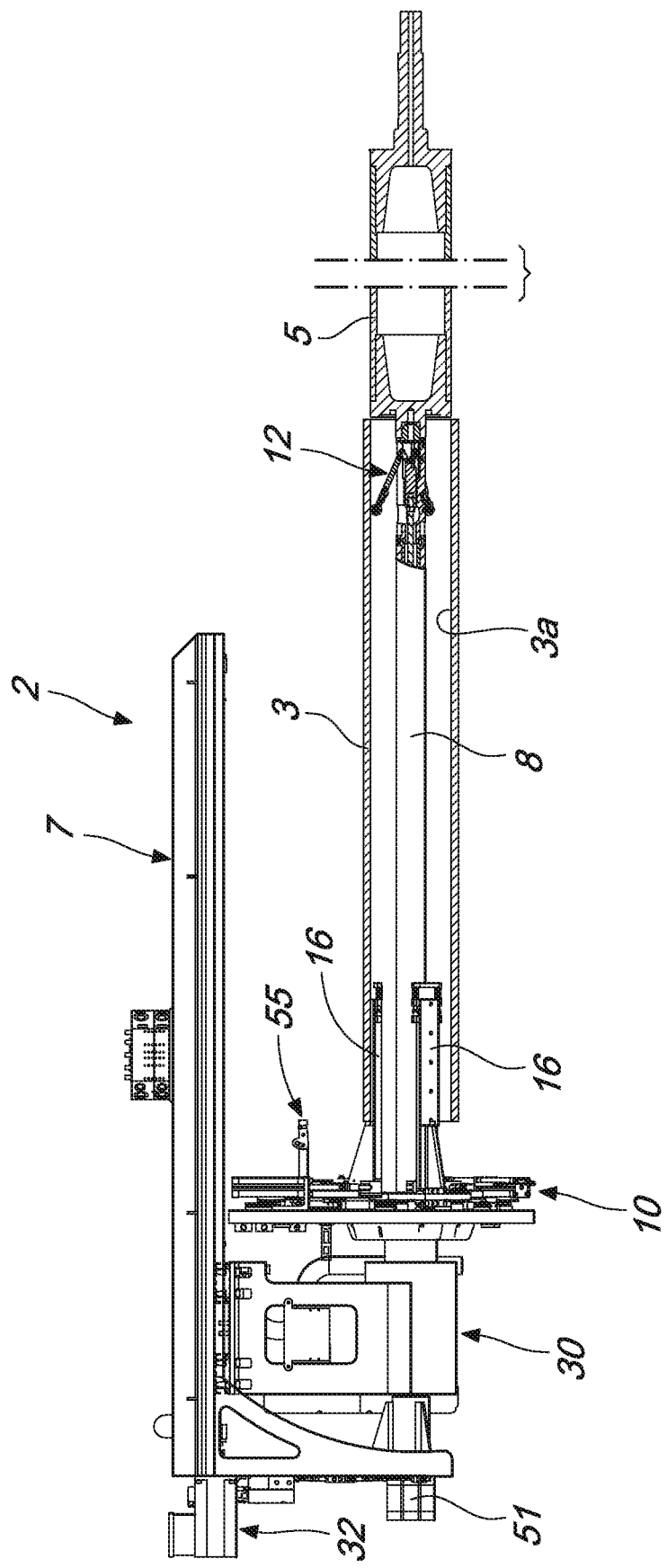
Figure 25:
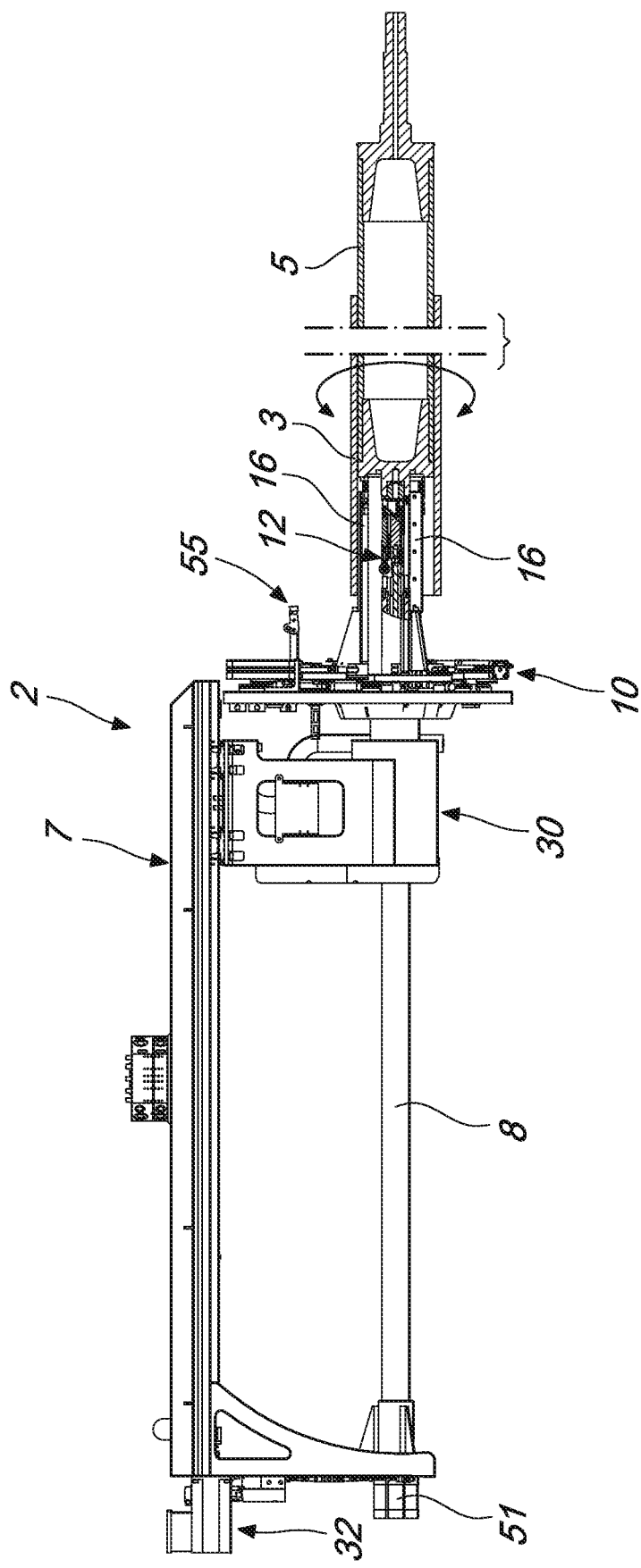

Once the supporting rod 8 is mated with the axial shank of the sleeve-holding shaft 5, the sliding support means 13 are brought to the extended condition in order to center the printing sleeve 3 with respect to the sleeve-holding shaft 5, as shown in FIG. 24.

Subsequently, the carriage 30 is actuated in order to move the grip clamp 10 to its advanced working position and so begin ensheathing the printing sleeve 3 onto the sleeve-holding shaft 5.

As soon as the printing sleeve 3 comes into contact with the sleeve-holding shaft 5, the sliding support means 13 are returned to the folded condition.

At this point, while the grip clamp 10 continues its movement to the advanced working position, the grip clamp 10 is actuated so as to rotate about the axis of the supporting rod 8, alternately in one direction and in the other, preferably through an oscillation angle substantially of approximately 90°, so as to transmit a rotary motion to the grip clamp 10 about the axis of the supporting rod, to make it easier to ensheathe it onto the sleeve-holding shaft 5.

Once the printing sleeve 3 is ensheathed for at least one portion of its length, preferably at least half, the grip clamp 10 is actuated so as to rotate, in order to orient the printing sleeve 3 according to the correct positioning angle, with respect to the axis of the sleeve-holding shaft 5, and so ensure that its abutment recess engages with the reference pin on the sleeve-holding shaft 5.

The grip clamp 10, continuing its stroke toward the advanced working position, almost completely ensheathes the printing sleeve 3 onto the sleeve-holding shaft 5.

Subsequently, the grip claws 16 are brought back to the inactive position and the grip clamp 10 is moved to the retracted working position so as to retract the grip claws 16 from the axial cavity of the printing sleeve 3.

Once retracted from the axial cavity of the printing sleeve 3, the grip claws 16 of the grip clamp 10 are moved to the active position until corresponding elastic pusher means 60 are brought to a position facing the end face of the printing sleeve 3.

Figure 26:
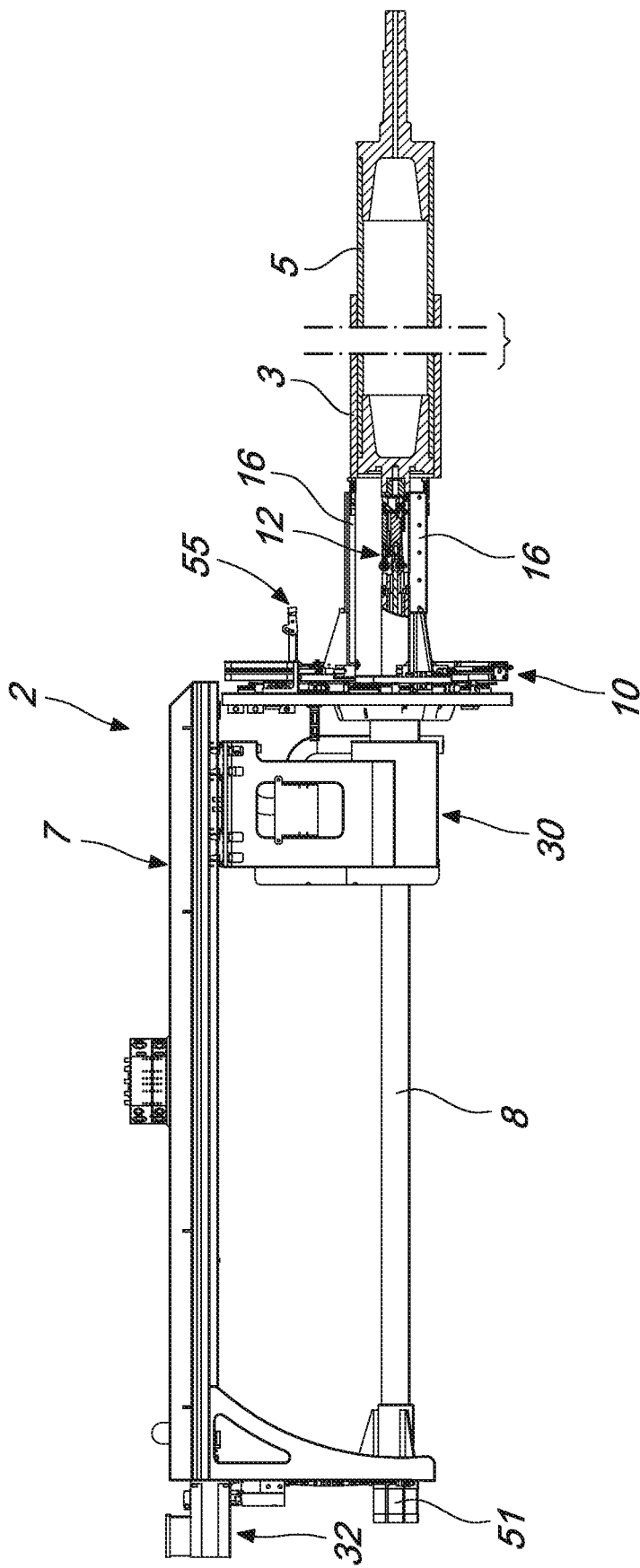

At this point, the carriage 30 is actuated again so as to move the grip clamp 10 to the advanced working position, ensuring that the elastic pusher means 60 of the grip claws engage against the end face of the printing sleeve 3, until the ensheathement of the printing sleeve 3 onto the sleeve-holding shaft 5 is completed, as shown in FIG. 26.

In practice it has been found that the invention fully achieves the intended aim and objects and, in particular, attention is drawn to the fact that the apparatus according to the invention, by virtue of the peculiar handling device, makes it possible to replace printing sleeves of different dimensions without being necessary in each instance to replace the handling device.

It should be noted that the apparatus according to the invention can be validly applied in the replacement of printing sleeves not only in flexographic printing machines but also in other types of rotary printing machines that use printing sleeves.

The invention, thus conceived, is susceptible of numerous modifications and variations, all of which are within the scope of the appended claims.

Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102022000016587 from which this application claims priority are incorporated herein by reference.

What is claimed is:

1. An apparatus for replacing printing sleeves, which comprises a handling device which is configured to be removably engaged with a printing sleeve and a movement robot for moving said handling device between a first position, in which said handling device is arranged proximate and substantially coaxial to a sleeve-holding shaft associated with a printing machine, and a second position, in which said handling device is arranged substantially at a sleeve-holding support of a printing sleeve storage magazine, wherein said handling device comprises a supporting frame, which is connected to said movement robot and supports a supporting rod which protrudes in a cantilevered manner from said supporting frame and can be positioned by said movement robot in a position that is substantially coaxially aligned with respect to an axis of said sleeve-holding shaft, said handling device comprising a self-centering grip clamp which is provided with engagement means and control means adapted to command said engagement means arranged around an axis of said supporting rod, said self-centering grip clamp being able to translate on command, with respect to said supporting frame, along a movement direction that is substantially parallel to the axis of said supporting rod, between at least one advanced working position, in which said self-centering grip clamp is arranged substantially proximate to a free end of said supporting rod, wherein said grip clamp comprises a base body which is mounted around said supporting rod, said engagement means comprising at least three grip claws, which are supported by said base body and are distributed, mutually angularly spaced apart, around the axis of said supporting rod, said grip claws being slideably movable on command by control means adapted to command said grip claws, in a synchronized manner, by actuation means, along a respective direction which is substantially perpendicular to the axis of said supporting rod, with respect to said base body said grip claws having an elongated extension along a direction that is substantially parallel to the axis of the supporting rod, and at least one retracted working position, which is arranged spaced apart along the axis of said supporting rod with respect to said advanced working position, said engagement means being movable on command between at least one inactive position, in which said engagement means are closer to the axis of said supporting rod, in order to allow insertion into or extraction of said engagement means from an internal cavity of said printing sleeve, and at least one active position, in which said engagement means are radially spaced apart from the axis of said supporting rod, in order to allow engagement of said engagement means with an internal surface of said printing sleeve; said apparatus further comprising, substantially at the free end of said supporting rod, a supporting assembly for supporting said printing sleeve, which is provided with sliding support means, which are configured to move on command between a retracted condition, in which the sliding support means are closer to the axis of said supporting rod, and an extended condition, in which the sliding support means can be slideably engaged by the internal surface of said printing sleeve, wherein said supporting assembly comprises at least three supporting arms, which are distributed around the axis of said supporting rod, each one of said supporting arms being hinged, at an intermediate portion thereof, to said supporting rod about a respective oscillation axis which is substantially perpendicular to a radial plane that passes through a longitudinal axis of the corresponding supporting arm and through the axis of said supporting rod, said supporting arms being functionally connected, at one of ends thereof, to actuation means which are supported by said supporting frame and can be activated on command by control means adapted to command said actuation means in order to produce a rotation of said supporting arms about the respective oscillation axes, said supporting arms supporting, at opposite ends thereof, a respective supporting wheel, which can be slideably engaged against the internal surface of said printing sleeve.

2. The apparatus according to claim 1, wherein said grip clamp is actuatable in rotation about the axis of said supporting rod.

3. The apparatus according to claim 1, wherein said base body is supported by a carriage which is slideably mounted along at least one linear guide which is supported by said supporting frame and extends substantially parallel to the axis of said supporting rod, said carriage being actuatable in translation along said at least one linear guide by movement means which are supported by said supporting frame.

4. The apparatus according to claim 3, wherein said base body is actuatable in rotation about a rotation axis which is substantially parallel to the axis of said supporting rod, with respect to said carriage, by virtue of motor means supported by said carriage.

5. The apparatus according to claim 3, wherein said grip clamp is provided with position sensing means which are adapted to detect a presence of said printing sleeve and are functionally connected to control means which drive said movement means as a function of signals that arrive from said position sensing means.

6. The apparatus according to claim 5, wherein self-centering said grip clamp is provided with pressure sensing means which are functionally connected to said control means and are structured to detect a contact pressure applied by said grip claws against the internal surface of said printing sleeve, said control means being adapted to drive said actuation means as a function of the signals originating from said pressure sensing means.

7. The apparatus according to claim 1, wherein said grip claws have elastic pusher means which can engage against an end of said printing sleeve that is directed toward said handling device.

\* \* \* \* \*